US012165556B2

(12) United States Patent
Hong et al.

(10) Patent No.: US 12,165,556 B2
(45) Date of Patent: Dec. 10, 2024

(54) DISPLAY DEVICE AND DEGRADATION COMPENSATING METHOD THEREOF

(71) Applicant: Samsung Display Co., LTD., Yongin-si (KR)

(72) Inventors: Seok Ha Hong, Yongin-si (KR); Joon Chul Goh, Yongin-si (KR); Dong Joon Kwag, Yongin-si (KR); Hyung Jin Kim, Yongin-si (KR); Ji Eun Park, Yongin-si (KR); Jae Sung Bae, Yongin-si (KR); Young Soo Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/883,848

(22) Filed: Aug. 9, 2022

(65) Prior Publication Data

US 2023/0104678 A1 Apr. 6, 2023

(30) Foreign Application Priority Data

Oct. 5, 2021 (KR) ........................ 10-2021-0131956

(51) Int. Cl.
*G09G 3/20* (2006.01)

(52) U.S. Cl.
CPC ..... *G09G 3/2003* (2013.01); *G09G 2310/027* (2013.01); *G09G 2320/0233* (2013.01); *G09G 2320/0242* (2013.01); *G09G 2320/0285* (2013.01); *G09G 2320/043* (2013.01); *G09G 2360/16* (2013.01)

(58) Field of Classification Search
None
See application file for complete search history.

(56) References Cited

U.S. PATENT DOCUMENTS

2016/0103171 A1* 4/2016 Tsutsui ............... G01R 31/2635 257/40
2016/0335965 A1* 11/2016 Huang ................. G09G 3/3208
(Continued)

FOREIGN PATENT DOCUMENTS

KR 10-1881359 7/2018
WO 2016-144501 9/2016

*Primary Examiner* — Benjamin C Lee
*Assistant Examiner* — Emily J Frank
(74) *Attorney, Agent, or Firm* — KILE PARK REED & HOUTTEMAN PLLC

(57) ABSTRACT

A display device includes a display part, a degradation compensator that generates a first compensated grayscale value by compensating for a first grayscale value corresponding to a first pixel, and generates a second compensated grayscale value by compensating for a second grayscale value corresponding to a second pixel, and a data driver that generates a first data signal based on the first compensated grayscale value to supply the first data signal to the first pixel, and generates a second data signal based on the second compensated grayscale value to supply the second data signal to the second pixel. A second degradation curve is defined by a first degradation coefficient corresponding to a first degradation curve, and a second degradation coefficient corresponding to a first estimated degradation curve for the light conversion particles of a second color calculated by applying the first degradation curve.

12 Claims, 15 Drawing Sheets

(56) References Cited

U.S. PATENT DOCUMENTS

| | | | | |
|---|---|---|---|---|
| 2017/0076661 | A1* | 3/2017 | Zhang | G09G 3/2003 |
| 2018/0182330 | A1* | 6/2018 | Hosoumi | G02F 1/1336 |
| 2020/0327843 | A1* | 10/2020 | Ahmed | G09G 3/3233 |
| 2023/0063949 | A1* | 3/2023 | Ueno | H01L 31/06 |

* cited by examiner

PX: PX1, PX2, PX3

GL: SL, SSL
M: M1, M2, M3

DISPLAY DEVICE AND DEGRADATION COMPENSATING METHOD THEREOF

CROSS-REFERENCE TO RELATED APPLICATION(S)

This application claims priority to and benefits of Korean Patent Application No. 10-2021-0131956 under 35 U.S.C. § 119 filed on Oct. 5, 2021 in the Korean Intellectual Property Office, the entire contents of which are incorporated herein by reference.

BACKGROUND

1. Technical Field

An embodiment relates to a display device and a degradation compensating method thereof.

2. Description of the Related Art

Recently, interest in an information display is increasing. Accordingly, research and development on a display device are continuously being conducted.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure has been made in an effort to provide a display device and a degradation compensating method thereof that may effectively compensate for degradation of pixels.

Objects are not limited to the objects mentioned above, and other technical objects may be clearly understood to one of ordinary skill in the art using the following description.

An embodiment provides a display device that may include a display part that may include a first pixel including a light emitting element of a first color; and a second pixel including another light emitting element of the first color; and light conversion particles of a second color that change the first color to the second color; a degradation compensator that generates a first compensated grayscale value by compensating for a first grayscale value corresponding to the first pixel based on a first degradation curve defining an estimated luminance according to an accumulated use time of the first pixel, and generates a second compensated grayscale value by compensating for a second grayscale value corresponding to the second pixel based on a second degradation curve defining an estimated luminance according to an accumulated use time of the second pixel; and a data driver that generates a first data signal based on the first compensated grayscale value and supplies the first data signal to the first pixel, and generates a second data signal based on the second compensated grayscale value and supplies the second data signal to the second pixel. The second degradation curve may be defined by a first degradation coefficient corresponding to the first degradation curve, and a second degradation coefficient corresponding to a first estimated degradation curve for the light conversion particles of the second color calculated by applying the first degradation curve.

The first degradation curve may be defined by Equation 1:

$$L1 = \exp\left[-\left(\frac{t_1}{\tau_1}\right)^{\beta_1}\right] \quad \text{[Equation 1]}$$

wherein, L1 is the estimated luminance according to the accumulated use time of the first pixel, $t_1$ is the accumulated use time of the first pixel, and $\tau_1$ and $\beta_1$ are the first degradation coefficients determined by an initial degradation curve of the first pixel detected in a degradation evaluation of the first pixel.

The second degradation curve may be defined by Equation 2:

$$L2' = \exp\left[-\left(\frac{t_2}{\tau_1}\right)^{\beta_1} - \left(\frac{t_2}{\tau_{q1}}\right)^{\beta_{q1}}\right] \quad \text{[Equation 2]}$$

wherein, L2' is the estimated luminance according to the accumulated use time of the second pixel, $t_2$ is the accumulated use time of the second pixel, and $\tau_{q1}$ and $\beta_{q1}$ are the second degradation coefficients determined by the initial degradation curve of the first pixel and an initial degradation curve of the second pixel detected in a degradation evaluation of the second pixel.

The first estimated degradation curve may be a degradation curve generated according to a ratio of a normalized luminance value of the initial degradation curve of the first pixel to a normalized luminance value of the initial degradation curve of the second pixel, and the second degradation coefficient may be a degradation constant determined by the first estimated degradation curve.

The display part may include a third pixel that may include another light emitting element of the first color and light conversion particles that change the first color to a third color.

The degradation compensator may generate a third compensated grayscale value by compensating for a third grayscale value corresponding to the third pixel based on a third degradation curve defining an estimated luminance according to an accumulated use time of the third pixel, and the data driver may generate a third data signal based on the third compensated grayscale value and supplies the third data signal to the third pixel.

The third degradation curve may be defined by the first degradation coefficient, and a third degradation coefficient corresponding to a second estimated degradation curve for the light conversion particles of the third color calculated by applying the first degradation curve.

The third degradation curve may be defined by Equation 3:

$$L3' = \exp\left[-\left(\frac{t_3}{\tau_1}\right)^{\beta_1} - \left(\frac{t_3}{\tau_{q2}}\right)^{\beta_{q2}}\right] \quad \text{[Equation 3]}$$

wherein, L3' is the estimated luminance according to the accumulated use time of the third pixel, $t_3$ is the accumulated use time of the third pixel, and $\tau_{q2}$ and $\beta_{q2}$ are the third degradation coefficients determined by the initial degradation curve of the first pixel and an initial degradation curve of the third pixel detected in a degradation evaluation of the third pixel.

The second estimated degradation curve may be a degradation curve generated according to a ratio of a normalized luminance value of the initial degradation curve of the first pixel to a normalized luminance value of the initial degradation curve of the third pixel, and the third degradation coefficient may be a degradation constant determined by the second estimated degradation curve.

The first pixel may emit light of the first color, and the second pixel may emit light of the second color.

Each of the first pixel and the second pixel may include at least one blue light emitting element, and the light conversion particles of the second color may be red quantum dots or green quantum dots.

An embodiment may include a degradation compensating method of the display device may include detecting degradation characteristics of a first pixel and a second pixel to detect a first initial degradation curve for the first pixel and a second initial degradation curve for the second pixel; detecting a first degradation coefficient based on the first initial degradation curve; detecting a second degradation coefficient based on the first initial degradation curve and the second initial degradation curve; generating a first compensated grayscale value by compensating for a first grayscale value of the first pixel by applying the first degradation coefficient, and generating a second compensated grayscale value by compensating for a second grayscale value of the second pixel by applying the first degradation coefficient and the second degradation coefficient; generating a first data signal corresponding to the first compensated grayscale value, and generating a second data signal corresponding to the second compensated grayscale value; and supplying the first data signal to the first pixel, and supplying the second data signal to the second pixel.

The degradation compensating method of the display device may further include modeling a first degradation curve for the first pixel by the first initial degradation curve.

The first degradation curve may be defined by Equation 1:

$$L1 = \exp\left[-\left(\frac{t_1}{\tau_1}\right)^{\beta_1}\right] \quad \text{[Equation 1]}$$

wherein, L1 is an estimated luminance according to an accumulated use time of the first pixel, $t_1$ is the accumulated use time of the first pixel, and $\tau_1$ and $\beta_1$ are the first degradation coefficients determined by the first initial degradation curve.

The detecting of the second degradation coefficient may include calculating a ratio of a first luminance and a second luminance to calculate a first estimated degradation curve, the first luminance being the estimated luminance according to the accumulated use time of the first pixel according to the first initial degradation curve, and the second luminance being an estimated luminance according to an accumulated use time of the second pixel according to the second initial degradation curve; and detecting the second degradation coefficient based on the first estimated degradation curve.

The degradation compensating method of the display device may further include defining a second degradation curve according to the accumulated use time of the second pixel based on the first degradation coefficient and the second degradation coefficient.

The second degradation curve may be defined by Equation 2:

$$L2' = \exp\left[-\left(\frac{t_2}{\tau_1}\right)^{\beta_1} - \left(\frac{t_2}{\tau_{q1}}\right)^{\beta_{q1}}\right] \quad \text{[Equation 2]}$$

wherein, L2' is the estimated luminance according to the accumulated use time of the second pixel, $t_2$ is the accumulated use time of the second pixel, and $\tau_{q1}$ and $\beta_{q1}$ are the second degradation coefficients determined by the first initial degradation curve and the second initial degradation curve.

Other embodiments are included in the detailed description and drawings.

The display device according to embodiments may include a first pixel including a light emitting element of a first color, and a second pixel including another light emitting element of the first color and light conversion particles of a second color. The display device may compensate for degradation of the first pixel by a first degradation curve corresponding to the first pixel, and may compensate for degradation of the second pixel by a second degradation curve defined by a first degradation coefficient corresponding to the first degradation curve and a second degradation coefficient corresponding to a first estimated degradation curve for the light conversion particles of the second color. Accordingly, it is possible to more accurately predict degradation of pixels according to a degradation characteristic of each of the pixels according to a structure and/or configuration of each of the pixels provided in a display part. Accordingly, it is possible to effectively compensate for degradation of the pixels and to improve image quality of the display device.

Effects of embodiments are not limited by what is illustrated in the above, and more various effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
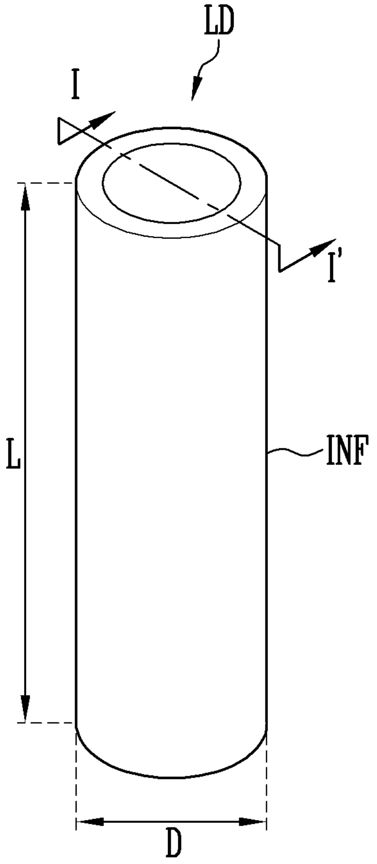
FIG. 1 illustrates a schematic perspective view of a light emitting element according to an embodiment.

Since the disclosure may be variously modified and have various forms, embodiments will be illustrated and described in detail in the following. In the description below, singular forms are to include plural forms unless the context clearly indicates otherwise. For example, as used herein, the singular forms, "a," "an," and "the" are intended to include the plural forms as well, unless the context clearly indicates otherwise.

In the drawings, sizes, thicknesses, ratios, and dimensions of the elements may be exaggerated for ease of description and for clarity. Like numbers refer to like elements throughout.

The disclosure is not limited to embodiments disclosed below, and it is to be understood that the disclosure includes all modifications, equivalents, and substitutions without departing from the scope and spirit of the disclosure. In addition, each embodiment disclosed below may be implemented alone, or may be implemented in combination with at least one other embodiment.

Throughout the accompanying drawings, the same reference numerals may be used for elements that are identical or similar to each other, even if they are illustrated on different drawings. In describing embodiments with reference to the accompanying drawings, redundant descriptions of the same or similar elements may be omitted or simplified.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

In describing the embodiments, the term "connection" may comprehensively mean a physical and/or electrical connection. In addition, this may comprehensively mean direct connection and indirect connection, and may comprehensively mean integral connection and non-integral connection.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Figure 2:
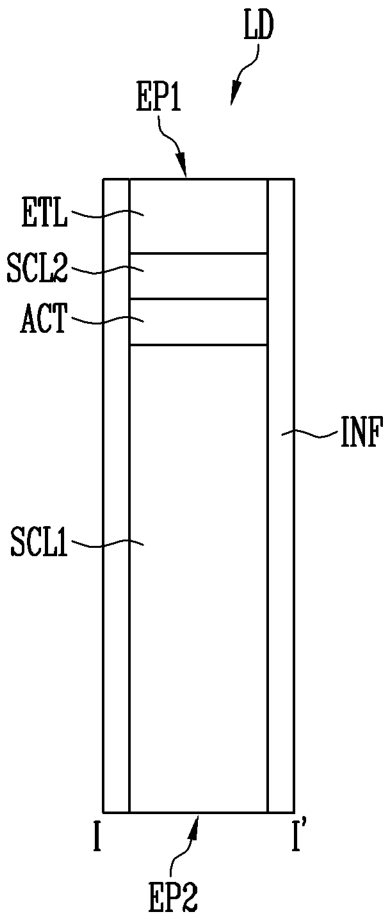
FIG. 2 illustrates a schematic cross-sectional view of a light emitting element according to an embodiment.

FIG. 1 illustrates a schematic perspective view of a light emitting element LD according to an embodiment. FIG. 2 illustrates a schematic cross-sectional view of a light emitting element LD according to an embodiment. For example, FIG. 1 shows an example of the light emitting element LD that may be used as a light source of a display device according to an embodiment, and FIG. 2 shows an example of a schematic cross-section of the emitting element LD taken along line I-I' of FIG. 1.

Referring to FIG. 1 and FIG. 2, the light emitting element LD may include a first semiconductor layer SCL1, an active layer ACT (also referred to as a "light emitting layer"), a second semiconductor layer SCL2 that may be sequentially disposed and/or stacked each other along one direction or a direction (for example, a length direction), and an insulating film INF covering or overlapping outer circumferential surfaces (for example, side surfaces) of the first semiconductor layer SCL1, the active layer ACT, and the second semiconductor layer SCL2. In an embodiment, the light emitting element LD may further include an electrode layer ETL disposed on the second semiconductor layer SCL2. The insulating film INF may or may not at least partially cover or overlap the outer circumferential surface of the electrode layer ETL. In an embodiment, the light emitting element LD may further include another electrode layer disposed on one surface or a surface (for example, a lower surface) of the first semiconductor layer SCL1.

In an embodiment, the light emitting element LD may be provided in a rod-like shape. In describing an embodiment, the rod shape may include a rod-like shape or bar-like shape of various types including a circular pillar shape or a polygonal pillar shape, and a shape of a cross-section thereof is not particularly limited. In an embodiment, a length L of the light emitting element LD may be larger than a diameter D thereof (or a width of a lateral cross-section thereof).

The light emitting element LD may include a first end portion EP1 and a second end portion EP2 that face each other. For example, the light emitting element LD may include the first end portion EP1 and the second end portion EP2 at both ends of a length direction (or a thickness direction) thereof. The first end portion EP1 of the light emitting element LD may include a first base surface (for example, an upper surface) of the light emitting element LD and/or a peripheral area thereof. The second end portion EP2 of the light emitting element LD may include a second base surface (for example, a lower surface) of the light emitting element LD and/or a peripheral area thereof.

The first semiconductor layer SCL1, the active layer ACT, the second semiconductor layer SCL2, and the electrode layer ETL may be sequentially disposed in a direction from the second end portion EP2 to the first end portion EP1 of the light emitting element LD. For example, the electrode layer ETL (or second semiconductor layer SCL2) may be disposed on the first end portion EP1 of the light emitting element LD, and the first semiconductor layer SCL1 (or another electrode layer adjacent to the first semiconductor layer SCL1 and electrically connected to the first semiconductor layer SCL1) may be disposed on the second end portion EP2 of the light emitting element LD.

The first semiconductor layer SCL1 may include a first conductive type of semiconductor layer including a first conductive type of dopant. For example, the first semiconductor layer SCL1 may be an N-type of semiconductor layer including an N-type of dopant.

In an embodiment, the first semiconductor layer SCL1 may include a nitride-based semiconductor material or a phosphide-based semiconductor material. For example, the first semiconductor layer SCL1 may include a nitride-based semiconductor material including at least one of GaN, AlGaN, InGaN, AlInGaN, AlN, and InN, or a phosphide-based semiconductor material including at least one of GaP, GaInP, AlGaP, AlGaInP, AlP, and InP. In an embodiment, the first semiconductor layer SCL1 may include an N-type of dopant such as Si, Ge, Sn, or the like within the spirit and the scope of the disclosure. The material included in the first semiconductor layer SCL1 is not limited thereto, and in, various materials may be used to form the first semiconductor layer SCL1.

The active layer ACT may be disposed on the first semiconductor layer SCL1. The active layer ACT may include a single or multiple quantum well (QW) structure. In case that a voltage equal to or greater than the threshold voltage is applied to respective ends of the light emitting element LD, electron-hole pairs may be recombined in the active layer ACT, and thus light may be emitted.

In an embodiment, the active layer ACT may emit light of a visible ray wavelength band, for example, light in a range of about 400 nm to about 900 nm wavelength band. For example, the active layer ACT may emit blue light having a wavelength ranging from about 450 nm to about 480 nm, green light having a wavelength ranging from about 480 nm to about 560 nm, or red light having a wavelength ranging from about 620 nm to 750 nm. The color and/or wavelength band of the light generated by the active layer ACT may be changed.

In an embodiment, the active layer ACT may include a nitride-based semiconductor material or a phosphide-based semiconductor material. For example, the active layer ACT may include a nitride-based semiconductor material including at least one of GaN, AlGaN, InGaN, InGaAlN, AlN, InN, and AlInN, or a phosphide-based semiconductor material including at least one of GaP, GaInP, AlGaP, AlGaInP, AlP, and InP. Various materials may be used to form the active layer ACT.

In an embodiment, the active layer ACT may include an element involved in a color (or wavelength band) of light, and a color of light generated in the active layer ACT by adjusting a content and/or composition ratio of the element may be controlled. For example, the active layer ACT may be formed to have a multi-layered structure in which a GaN layer and an InGaN layer may be alternately and/or repeatedly stacked each other, and it may emit light of a color corresponding to a content and/or composition ratio of indium (In) included in the InGaN layer. Accordingly, the light emitting element LD of a desired color may be manufactured by adjusting the content and/or composition ratio of indium (In) included in the active layer ACT.

The second semiconductor layer SCL2 may be disposed on the active layer ACT. The second semiconductor layer SCL2 may include a second conductive type of semiconductor layer including a second conductive type of dopant. For example, the second semiconductor layer SCL2 may be a P-type of semiconductor layer including a P-type of dopant.

In an embodiment, the second semiconductor layer SCL2 may include a nitride-based semiconductor material or a phosphide-based semiconductor material. For example, the second semiconductor layer SCL2 may include a nitride-based semiconductor material including at least one of GaN, AlGaN, InGaN, AlInGaN, AlN, and InN, or a phosphide-based semiconductor material including at least one of GaP, GaInP, AlGaP, AlGaInP, AlP, and InP. In an embodiment, the second semiconductor layer SCL2 may include a P-type of dopant such as Mg. Various materials may be used to form the second semiconductor layer SCL2.

In an embodiment, the first semiconductor layer SCL1 and the second semiconductor layer SCL2 may include a same or similar semiconductor material, but may include dopants of different conductive types. In an embodiment, the first semiconductor layer SCL1 and the second semiconductor layer SCL2 may include different semiconductor materials, and may include dopants of different conductive types.

In an embodiment, the first semiconductor layer SCL1 and the second semiconductor layer SCL2 may have different lengths (or thicknesses) in the length direction of the light emitting element LD. For example, the first semiconductor layer SCL1 may have a longer length (or thicker thickness) than that of the second semiconductor layer SCL2 along the length direction of the light emitting element LD. Accordingly, the active layer ACT may be positioned closer to the first end portion EP1 (for example, the P-type of end portion) than the second end portion EP2 (for example, the N-type of end portion).

The electrode layer ETL may be disposed on the second semiconductor layer SCL2. The electrode layer ETL may protect the second semiconductor layer SCL2, and may be a contact electrode for readily connecting the second semiconductor layer SCL2 to at least one circuit element, an electrode, and/or a wire. For example, the electrode layer ETL may be an ohmic contact electrode or a Schottky contact electrode.

In an embodiment, the electrode layer ETL may include metal or a metal oxide. For example, the electrode layer ETL may be formed by singly using or mixing a metal such as chromium (Cr), titanium (Ti), aluminum (Al), gold (Au), nickel (Ni), or copper (Cu), and an oxide or alloy thereof; and a transparent conductive material such as an indium tin oxide (ITO), an indium zinc oxide (IZO), an indium tin zinc oxide (ITZO), a zinc oxide (ZnO), or an indium oxide ($In_2O_3$). Various conductive materials may be used to form the electrode layer ETL.

In an embodiment, the electrode layer ETL may be substantially transparent. Accordingly, light generated by the light emitting element LD may pass through the electrode layer ETL to be emitted from the first end portion EP1 of the light emitting element LD.

The insulating film INF may be provided on a surface of the light emitting element LD to surround side surfaces of the first semiconductor layer SCL1, the active layer ACT, the second semiconductor layer SCL2, and the electrode layer ETL. Accordingly, electrical stability of the light emitting element LD may be secured, and a short circuit defect through the light emitting element LD may be prevented.

The insulating film INF may expose the electrode layer ETL (or second semiconductor layer SCL2) and the first semiconductor layer SCL1 (or another electrode layer provided at the second end portion EP2 of the light emitting element LD) at the first end portion EP1 and the second end portion EP2 of the light emitting element LD, respectively. For example, the insulating film INF may not be provided on two base surfaces corresponding to the first and second end portions EP1 and EP2 of the light emitting element LD (for example, an upper surface and a lower surface of the light emitting element LD). Accordingly, by connecting the first end portion EP1 and the second end portion EP2 of the light emitting element LD to at least one electrode, a wire, and/or a conductive pattern, respectively, an electrical signal (for example, driving power source and/or signal) may be applied to the light emitting element LD.

In case that the insulating film INF is provided on the surface of the light emitting element LD, it is possible to improve life-span and efficiency thereof by minimizing surface defects of the light emitting element LD. Even in case that the light emitting elements LD are adjacent to each other, it is possible to prevent a short circuit defect from occurring between the light emitting elements LD.

In an embodiment, the light emitting element LD may be manufactured through a surface treatment process. For example, in case that the light emitting elements LD are mixed with a fluid solution (or an ink) and supplied to each light emitting area (for example, a light emitting area of a pixel), each light emitting element LD may be surface-treated so that the light emitting elements LD are not non-uniformly aggregated in the solution and are uniformly distributed.

The insulating film INF may include a transparent insulating material. Accordingly, light generated by the active layer ACT may transmit through the insulating film INF to be emitted to the outside of the light emitting element LD. For example, the insulating film INF may include at least one insulating material of a silicon oxide ($SiO_x$) (for example, $SiO_2$), a silicon nitride ($SiN_x$) (for example, $Si_3N_4$), an aluminum oxide ($Al_xO_y$) (for example, $Al_2O_3$), and a titanium oxide ($Ti_xO_y$) (for example, $TiO_2$), but is not limited thereto.

The insulating film INF may be a single layer or multilayer. For example, the insulating film INF may be formed as a double film.

In an embodiment, the insulating film INF may be partially etched (or removed) at a portion corresponding to at least one of the first end portion EP1 and the second end portion EP2 of the light emitting element LD. For example, the insulating film INF may be etched to have a rounded shape at the first end portion EP1 of the light emitting element LD, but the shape of the insulating film INF is not limited thereto.

In an embodiment, the light emitting element LD may have a small size in a range of nanometers to micrometers. For example, the light emitting element LD may each have the diameter D (or a width of a lateral cross-section) and/or the length L ranging from a nanometer to micrometer. For example, the light emitting element LD may have a diameter D and/or a length L ranging from approximately several tens of nanometers to several tens of micrometers. However, the size of the light emitting element LD may be changed.

The structure, shape, size, and/or type of the light emitting element LD may be changed according to embodiments. For example, the structure, shape, size, and/or type of the light emitting element LD may be variously changed according to a design condition of a light emitting device using the light emitting element LD or a light emitting characteristic to be secured.

The light emitting device including the light emitting element LD may be used in various types of devices that require a light source. For example, the light emitting elements LD may be disposed in a pixel of a display device, and the light emitting elements LD may be used as a light source of the pixel. The light emitting element LD may be used in other types of devices that require a light source, such as a lighting device.

Figure 3:
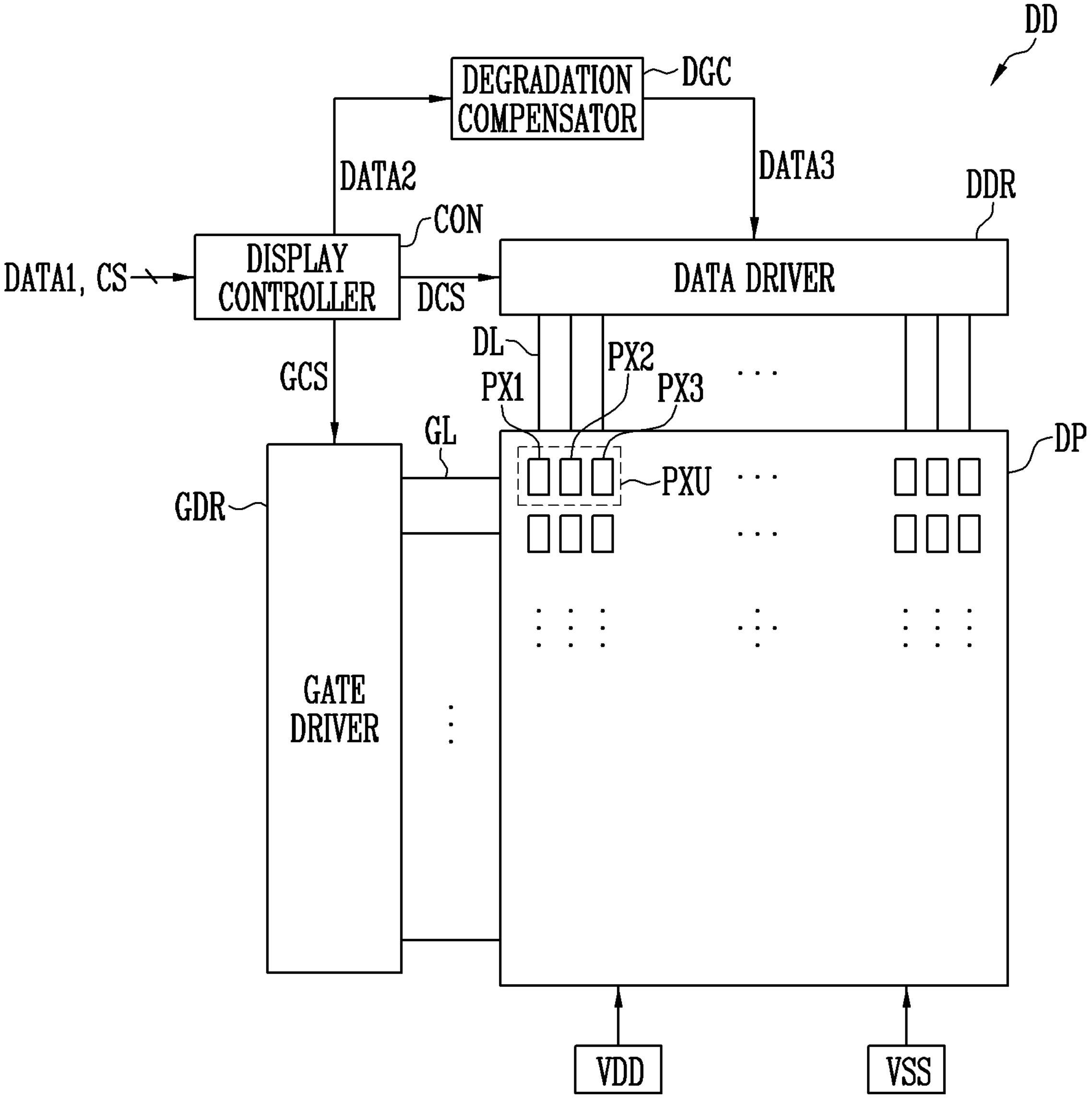
FIG. 3 illustrates a block diagram of a display device according to an embodiment.

FIG. 3 illustrates a block diagram of a display device DD according to an embodiment.

Referring to FIG. 3, the display device DD may include a display part DP (for example, display panel), a gate driver GDR (for example, scan driver), a data driver DDR, a display controller CON (for example, timing controller), and a degradation compensator DGC (for example, data converter). In FIG. 3, the display controller CON and the degradation compensator DGC are illustrated separately from each other, but embodiments are not limited thereto. For example, the display controller CON and the degradation compensator DGC may be integrated into one driving IC.

The display part DP may include gate lines GL, data lines DL, and pixels PX. In an embodiment, the gate lines GL may include at least scan lines (for example, scan line SL of FIG. 4), and may further include control lines (for example, control line SSL of FIG. 4).

Each pixel PX may be connected to at least one gate line GL and at least one data line DL. As an example, the pixel PX disposed in an i-th (i is a natural number) row and a j-th (j is a natural number) column of the display part DP may be connected to an i-th scan line and a j-th data line, and may be selectively connected to an i-th control line.

A driving timing of the pixels PX may be controlled by gate signals (for example, respective scan signals and/or control signals) supplied to the pixels PX through respective gate lines GL (for example, respective scan lines and/or control lines). Light emitting luminance of the pixels PX corresponding to respective data signals supplied to the pixels PX supplied through respective data lines DL may be controlled.

First and second power source voltages (or first and second power voltages) VDD and VSS may be supplied to the display part DP. The first and second power source voltages VDD and VSS are voltages required for an operation of the pixel PX, and the first power source voltage VDD may have a voltage level higher than that of the second power source voltage VSS.

In an embodiment, the display part DP may include at least two types of pixels PX for emitting light of different colors. For example, in the display part DP, the first pixels PX1 emitting light of the first color, the second pixels PX2 emitting light of the second color, and the third pixels PX3 emitting light of the third color may be arranged or disposed. At least one first pixel PX1, at least one second pixel PX2, and at least one third pixel PX3 disposed to be adjacent to each other may form one pixel unit PXU.

In an embodiment, the first pixel PX1 may be a blue pixel for emitting blue light, and the second pixel PX2 may be a green pixel for emitting green light. The third pixel PX3 may be a red pixel for emitting red light. The color of the light emitted from the pixels PX forming each pixel unit PXU may be variously changed.

The gate driver GDR may generate gate signals based on gate control signals GCS, and may supply the generated gate signals to respective gate lines GL. The gate control signal GCS may be supplied from the display controller CON to the gate driver GDR, and may include a start signals and clock signals for controlling an operation of the gate driver GDR. In an embodiment, the gate driver GDR may include a scan driver, and the gate control signals GCS may include a scan start signal and scan clock signals for driving the scan driver.

The data driver DDR may generate data signals based on data control signals DCS and compensated data DATA3, and may supply the generated data signals to respective data lines DL. The data control signals DCS may be supplied from the display controller CON to the data driver DDR, and may include a sampling pulse (for example, source sampling pulse), a clock signal (for example, source clock signal), and an output enable signal (for example, source output enable signal), for controlling an operation of the data driver DDR. The compensated data DATA3 may be supplied from the degradation compensator DGC to the data driver DDR. The data driver DDR may generate data signals corresponding to grayscale values included in the compensated data DATA3, and may supply the generated data signals to respective pixels PX through the data lines DL.

The display controller CON may receive input image data DATA1 and a control signal CS from the outside (for example, a graphic processor). The control signals CS may include timing signals such as a vertical synchronization signal, a horizontal synchronization signal, and a main clock signal.

The display controller CON may generate the gate control signals GCS and the data control signals DCS based on the control signal CS, and may output the generated gate control signals GCS and data control signals DCS to the gate driver GDR and the data driver DDR, respectively.

The display controller CON may generate image data DATA2 by converting the input image data DATA1. For example, the display controller CON may convert a format of the input image data DATA1 according to pixel arrangement of the display part DP and/or an interface specification with the data driver DDR to generate the image data DATA2.

The degradation compensator DGC may calculate a degree of degradation of the pixels PX based on the image data DATA2, and may generate the compensated data DATA3 (or degradation-compensated data) by converting the image data DATA2 based on the degree of degradation of the pixels PX.

For example, the degradation compensator DGC may calculate a degree of degradation (for example, accumulated use time and/or stress) of the pixels PX by accumulating grayscale values of the pixels PX (for example, respective grayscale values corresponding to the pixels PX) included in the image data DATA2. In an embodiment, the degradation compensator DGC may calculate respective compensation values so that the luminance degraded according to the degradation of the pixels PX may be compensated based on a degradation curve and the degradation degree of the pixels PX, and may calculate compensated grayscale values by converting the grayscale values of the pixels PX by applying the compensation values. Here, the degradation curve may be stored in a form of a curve (or curved line) corresponding to a luminance reduction rate according to the degree of degradation of the pixels PX, or in an equation corresponding thereto. The compensated grayscale values may be included in the compensated data DATA3.

In embodiments, by compensating for grayscale values corresponding to the first pixels PX1, the second pixels PX2, and the third pixels PX3 by using different degradation curves (or different equations) for the first pixels PX1, the second pixels PX2, and the third pixels PX3, the compensated data DATA3 may be generated.

For example, the degradation compensator DGC may compensate a first grayscale value corresponding to each first pixel PX1 by using a first degradation curve (or a first equation and/or a first lookup table corresponding to the first degradation curve). The degradation compensator DGC may compensate a second grayscale value corresponding to each second pixel PX2 by using a second degradation curve (or a second equation and/or a second lookup table corresponding to the second degradation curve), and may compensate a third grays value corresponding to each third pixel PX3 by using a third degradation curve (or a third equation and/or a third lookup table corresponding to the third degradation curve).

The compensated data DATA3 may include compensated grayscale values corresponding to respective pixels PX. Respective compensated grayscale values may be generated as values that compensate for degradation of respective pixels PX.

The data driver DDR may generate data signals corresponding to the compensated grayscale values, and may output the data signals to respective pixels PX through the data lines DL. Accordingly, a data signal corresponding to the compensated grayscale value may be supplied to each pixel PX to compensate for degradation of the corresponding pixel PX. Accordingly, image quality degradation due to degradation of the pixels PX may be prevented.

Figure 4:
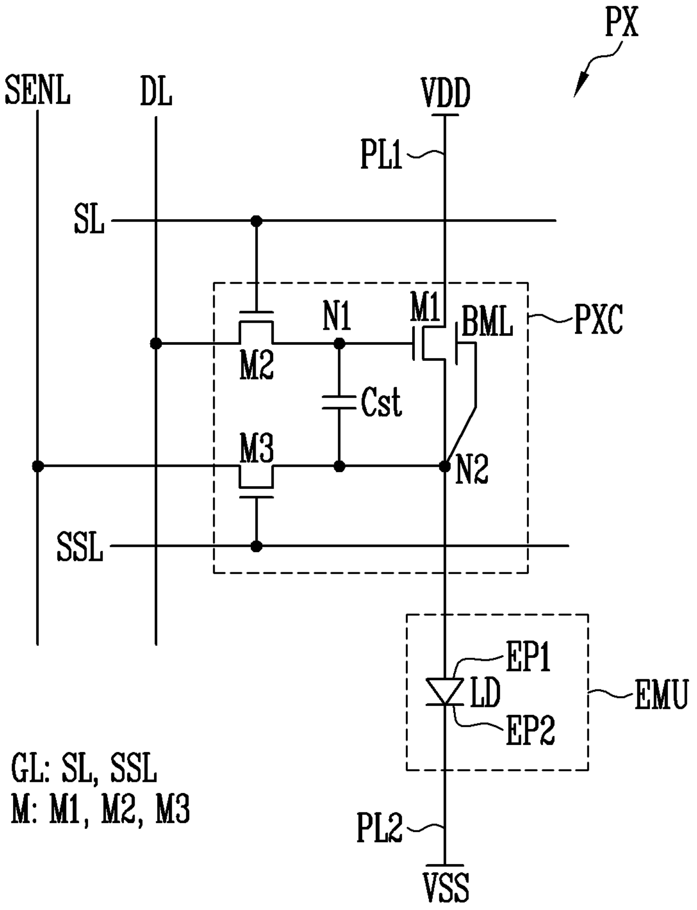
FIG. 4 and FIG. 5 respectively illustrate a schematic diagram of an equivalent circuit of a pixel according to an embodiment.
Figure 5:
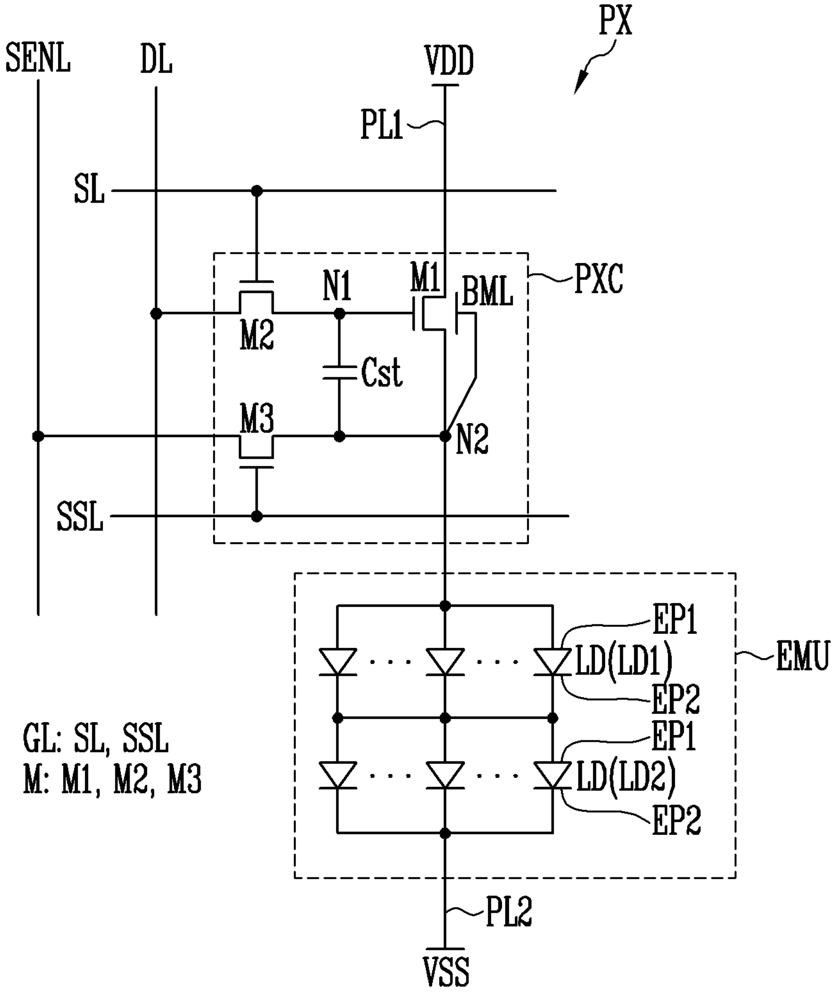

FIG. 4 and FIG. 5 respectively illustrate a schematic diagram of an equivalent circuit of a pixel PX according to an embodiment. For example, FIG. 4 and FIG. 5 illustrate the pixels PX including light emitting parts EMU having different structures.

Each pixel PX illustrated in FIG. 4 and FIG. 5 may be one of the pixels PX provided in the display part DP of FIG. 3. The pixels PX may have substantially the same or similar circuit structure to each other.

Referring to FIG. 4 and FIG. 5, the pixel PX may be connected to a scan line SL (also referred to as a "first scan line" or "first gate line"), a data line DL, a first power line PL1, and a second power line PL2. The pixel PX may be further connected to at least one other power line and/or signal line. For example, the pixel PX may be further connected to a sensing line SENL (also referred to an "initialization power line") and/or a control line SSL (also referred to as a "second scan line" or "second gate line").

The pixel PX may include the light emitting part EMU for generating light of luminance corresponding to each data signal. The pixel PX may further include a pixel circuit PXC for driving the light emitting part EMU.

The pixel circuit PXC may be connected to the scan line SL and the data line DL, and may be connected between the first power line PL1 and the light emitting part EMU. For example, the pixel circuit PXC may be connected to the scan line SL to which a scan signal (also referred to as a "first scan signal" or "first gate signal") is supplied, the data line DL to which a data signal is supplied, and a first power line PL1 to which the first power source voltage VDD is applied, and the light emitting part EMU.

The pixel circuit PXC may be selectively further connected to the control line SSL to which a control signal (also called a "second scan signal" or "second gate signal") is supplied, and the sensing line SENL connected to a reference power source (or initialization power source) or a sensing circuit in response to a display period or sensing period. The control signal may be the same as or different from the scan signal. In case that the control signal is the same signal as the scan signal, the control line SSL and the scan line SL may be integral with each other.

The pixel circuit PXC may include at least one transistor M and a capacitor Cst. For example, the pixel circuit PXC may include a first transistor M1, a second transistor M2, a third transistor M3, and the capacitor Cst.

The first transistor M1 may be connected between the first power line PL1 and a second node N2. The second node N2 may be a node at which the pixel circuit PXC and the light emitting part EMU are connected to each other. For example, the second node N2 may be a node in which one electrode (for example, a source electrode) of the first transistor M1 and the light emitting part EMU are electrically connected to each other. A gate electrode of the first transistor M1 may be connected to a first node N1. The first transistor M1 may control a driving current supplied to the light emitting part EMU in response to a voltage of the first node N1. For example, the first transistor M1 may be a driving transistor of the pixel PX.

In an embodiment, the first transistor M1 may further include a bottom metal layer BML (also referred to as "back gate electrode" or "second gate electrode"). In an embodiment, the bottom metal layer BML may be connected to one electrode (for example, a source electrode) of the first transistor M1.

In the embodiment in which the first transistor M1 may include the bottom metal layer BML, by applying a back-biasing voltage to the bottom metal layer BML of the first transistor M1, a back-biasing technique (or a sync technique) of moving a threshold voltage of the first transistor M1 in a negative or positive direction may be applied. In case that the bottom metal layer BML is disposed under or below a semiconductor pattern (for example, a semiconductor pattern SCP of FIG. 6) forming a channel of the first transistor M1, it may block the light incident on the semiconductor pattern to stabilizes operating characteristics of the first transistor M1.

The second transistor M2 may be connected between the data line DL and the first node N1. A gate electrode of the second transistor M2 may be connected to a scan line Si. In case that a scan signal of a gate-on voltage (for example, a logic high voltage or a high level voltage) is supplied from the scan line SL, the second transistor M2 may be turned on to connect the data line DL and the first node N1.

For each frame period, a data signal of the corresponding frame may be supplied to the data line DL, and the data signal may be transmitted to the first node N1 through the second transistor M2 during a period in which the scan signal of the gate-on voltage is supplied. For example, the second transistor M2 may be a switching transistor for transmitting each data signal to the inside of the pixel PX.

The capacitor Cst may be connected between the first node N1 and the second node N2. The capacitor Cst may be charged with a voltage corresponding to the data signal supplied to the first node N1 during each frame period.

The third transistor M3 may be connected between the second node N2 and the sensing line SENL. A gate electrode of the third transistor M3 may be connected to the control line SSL (or the scan line SL). The third transistor M3 may be turned on in case that the control signal (or scan signal) of a gate-on voltage (for example, a logic high voltage or high level voltage) is supplied from the control line SSL to transmit the reference voltage (or initialization voltage) supplied to the sensing line SENL to the second node N2 or to transmit the voltage of the second node N2 to the sensing line SENL. In an embodiment, the voltage of the second node N2 may be transmitted to the sensing circuit through the sensing line (SENL), and may be provided to the driving circuit (for example, timing controller) to be used for compensating the characteristic deviation of the pixels PX.

In FIG. 4 and FIG. 5, all of the transistors M included in the pixel circuit PXC are illustrated as N-type transistors, but embodiments are not limited thereto. For example, at least one of the first, second, and third transistors M1, M2, and M3 may be changed to a P-type transistor. The structure and driving method of the pixel PX may be variously changed according embodiments.

The light emitting part EMU may include at least one light emitting element LD connected between the first power line PL1 and the second power line PL2. For example, the light emitting part EMU may include at least one light emitting element LD including the first end portion EP1 connected to the first power line PL1 and the second end portion EP2 connected to the second power line PL2, through the pixel circuit PXC.

The first power source voltage VDD may be supplied to the first power line PL1. The second power source voltage VSS having a voltage level lower than that of the first power source voltage VDD may be supplied to the second power line PL2.

In an embodiment, the first end portion EP1 and the second end portion EP2 of the light emitting element LD may be a P-type end portion and an N-type end portion of the light emitting element LD, respectively. For example, the light emitting element LD may be electrically connected in a forward direction between the first power line PL1 and the second power line PL2. The light emitting element LD may form an effective light source of a corresponding pixel PX. For example, the light emitting element LD may emit light with luminance corresponding to a driving current supplied from the pixel circuit PXC during each frame period.

In an embodiment, the light emitting part EMU may include a single light emitting element LD connected in a forward direction between the first power line PL1 and the second power line PL2 (for example, between the pixel circuit PXC and the second power line PL2) as shown in FIG. 4. In an embodiment, the light emitting part EMU may include light emitting elements LD that are connected in a forward direction between the first power line PL1 and the second power line PL2. For example, the light emitting part EMU may include the light emitting elements LD connected in parallel-series between the pixel circuit PXC and the second power line PL2 as shown in FIG. 5. As an example, the light emitting part EMU may include first and second serial stages, and may include at least one first light emitting element LD1 that is disposed in and/or connected to the first serial stage and at least one second light emitting element LD2 that is disposed in and/or connected to the second serial stage. A connection structure of the light emitting elements LD forming each light emitting part EMU may be changed according to embodiments. For example, the light emitting elements LD may be connected to each other only in series or connected to each other only in parallel. The number, type, and/or connection structure of the light emitting element(s) LD forming an effective light source of each pixel PX may be variously changed according to embodiments.

In an embodiment, each light emitting element LD may be a rod-like shape of inorganic light emitting element. Each light emitting element LD may be an ultra-small light emitting element having a size in nanometer to micrometer range. However, the type, material, structure, size, and/or shape of the light emitting element LD may be variously changed according to embodiments.

Figure 6:
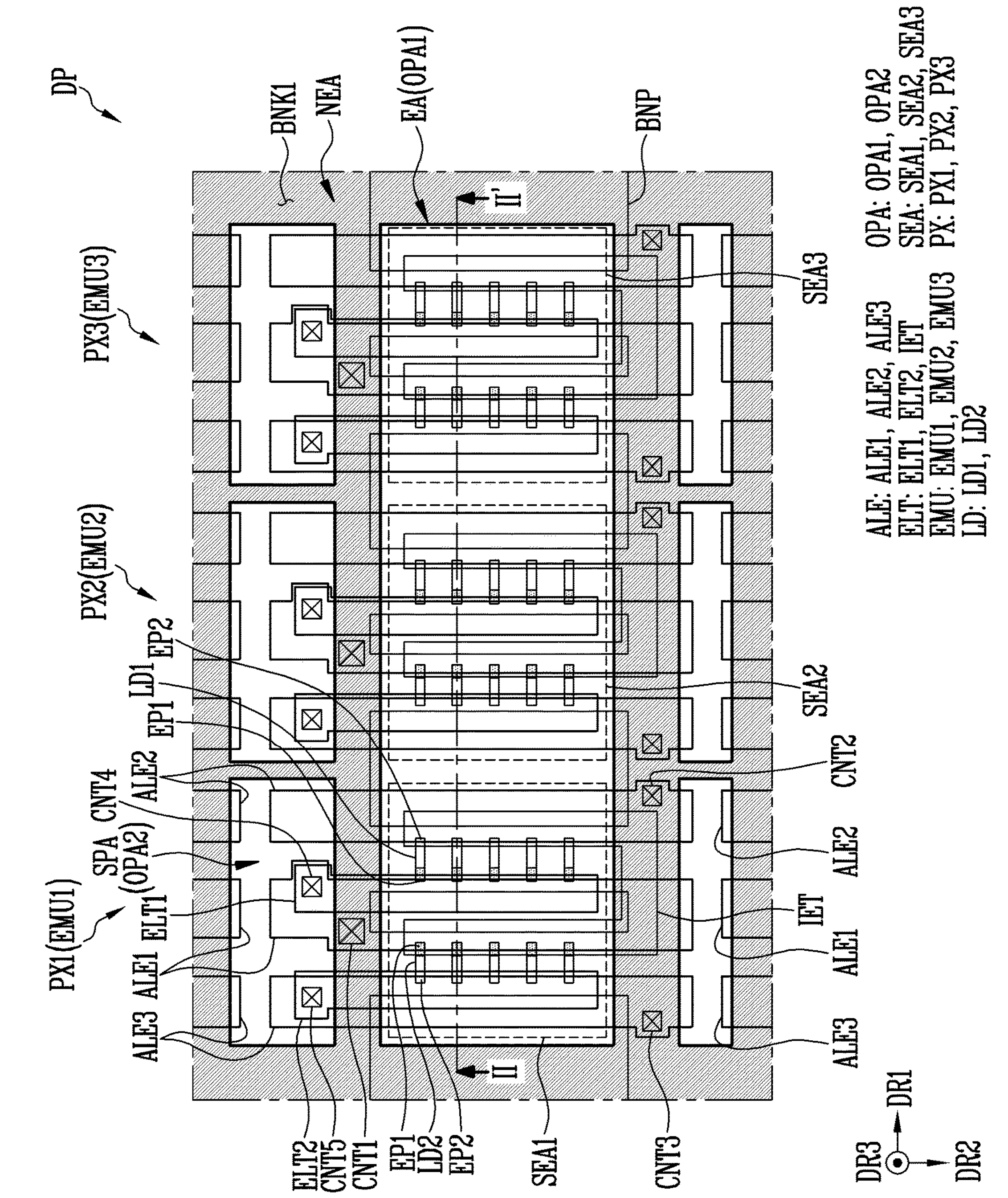
FIG. 6 illustrates a schematic top plan view of a display part according to an embodiment.

FIG. 6 illustrates a schematic top plan view of a display part DP according to an embodiment. For example, FIG. 6 illustrates a structure of the pixels PX based on an area in which the first pixel PX1, the second pixel PX2, and the third pixel PX3 forming one pixel unit PXU among the pixels PX provided on the display part DP of FIG. 3 are disposed. FIG. 6 illustrates a structure of the display part DP based on the light emitting parts EMU of the first pixel PX1, the second pixel PX2, and the third pixel PX3 (for example, a first light emitting part EMU1 provided in the first pixel PX1, a second light emitting part EMU2 provided in the second pixel PX2, and a third light emitting unit EMU3 provided in the third pixel PX3).

Referring to FIG. 3 to FIG. 6, the pixel unit PXU may include a light emitting area EA in which the light emitting elements LD of the pixels PX forming the corresponding pixel unit PXU are disposed. The light emitting area EA of each pixel unit PXU may include sub-light emitting areas SEA corresponding to pixels PX forming the corresponding pixel unit PXU.

For example, the first pixel PX1 may include a first sub-light emitting area SEA1 including at least one light emitting element LD and electrodes disposed around the light emitting element LD, and the second pixel PX2 may include a second sub-light emitting area SEA2 that is positioned around the first sub-light emitting area SEA1 and may include at least one light-emitting element LD and electrodes disposed around the light-emitting element LD. The third pixel PX3 may include a third sub-light emitting area SEA3 that is disposed around the first sub-light emitting area SEA1 and/or the second sub-light emitting area SEA2 and may include at least one light-emitting element LD and electrodes disposed around the light-emitting element LD. The pixel unit PXU including the first, second, and third pixels PX1, PX2, and PX3 may include the light emitting area EA including the first, second, and third sub-light emitting areas SEA1, SEA2, and SEA3.

In an embodiment, the pixels PX may be formed to have a similar or identical structure to each other. Accordingly, in FIG. 6, reference numerals are denoted based on the configuration of the first pixel PX1.

In an embodiment, each sub-light emitting area SEA may include at least two light emitting elements LD, and electrodes electrically connected to the light emitting elements LD. In an embodiment, the electrodes may include alignment electrodes ALE and pixel electrodes ELT (also referred to as "contact electrodes"). Each sub-light emitting area SEA may include bank patterns BNP disposed under or below the electrodes.

The alignment electrodes ALE may have various shapes, and may be spaced apart from each other. In an embodiment, the alignment electrodes ALE may be spaced apart from each other along the first direction DR1, and each thereof may have an extended shape along the second direction DR2. In an embodiment, the first direction DR1 may be a horizontal direction (for example, row direction, or X direction) of the display part DP, and the second direction DR2 may be a vertical direction (for example, column direction, or Y direction) of the display part DP, but the disclosure is not limited thereto. A third direction DR3 crossing or intersecting the first direction DR1 and the second direction DR2 may be a thickness direction (or a height direction) of the display part DP.

The shape, size, number, position, and/or mutual disposition structure of the alignment electrodes ALE may be variously changed according to embodiments. The alignment electrodes ALE may have a shape and/or size similar to or the same as each other, or may have different shapes and sizes.

The alignment electrodes ALE may include at least two electrodes spaced apart from each other. For example, the alignment electrodes ALE may include a first alignment electrode ALE1 and a second alignment electrode ALE2, and may optionally further include a third alignment electrode ALE3.

In an embodiment, the first alignment electrode ALE1 may be disposed at a center of each sub-light emitting area SEA, and the second alignment electrode ALE2 and the third alignment electrode ALE3 may be disposed at both sides of the first alignment electrode ALE1. For example, the second alignment electrode ALE2 may be disposed at the right side of the first alignment electrode ALE1, and the third alignment electrode ALE3 may be disposed at the left side of the first alignment electrode ALE1.

The alignment electrodes ALE (or, alignment lines before being separated into the alignment electrodes ALE of each of the pixels PX) may receive alignment signals necessary for aligning the light emitting elements LD in an aligning step of the light emitting elements LD. Accordingly, an electric field is formed between the alignment electrodes ALE, so that the light emitting elements LD may be aligned and/or arranged or disposed between the alignment electrodes ALE. In case that the light emitting elements LD are aligned and/or arranged or disposed between the alignment electrodes ALE, it means that at least a portion of each of the light emitting elements LD is disposed between the alignment electrodes ALE.

For example, the first alignment electrode ALE1, the second alignment electrode ALE2, and the third alignment electrode ALE3 (or a first alignment line in which the first alignment electrodes ALE1 of the pixels PX are connected, a second alignment line in which the second alignment electrodes ALE2 of the pixels PX are connected, and a third alignment line in which the third alignment electrodes ALE3 of the pixels PX are connected) may receive a first alignment signal, a second alignment signal, and a third alignment signal in the aligning step of the light emitting elements LD, respectively. The first alignment signal and the second alignment signal may have different waveforms, potentials, and/or phases. Accordingly, an electric field is formed between the first alignment electrode ALE1 and the second alignment electrode ALE2, so that the light emitting elements LD (for example, first light emitting elements LD1) may be aligned between the first alignment electrode ALE1 and the second alignment electrode ALE2. The first alignment signal and the third alignment signal may have different waveforms, potentials, and/or phases. Accordingly, an electric field is formed between the first alignment electrode ALE1 and the third alignment electrode ALE3, so that the light emitting elements LD (for example, second light emitting elements LD2) may be aligned between the first alignment electrode ALE1 and the third alignment electrode ALE3. The third alignment signal may be the same as or different from the second alignment signal.

The alignment electrodes ALE are at least disposed in respective sub-light emitting areas SEA, and may extend to a separation area SPA through a non-light emitting area NEA around the sub-light emitting areas SEA. The separation area SPA may be an area in which each alignment line (for example, the first alignment line, the second alignment line, and the third alignment line) is separated into the alignment electrodes ALE (for example, the first alignment electrode ALE1, the second alignment electrode ALE2, and the third alignment electrode ALE3) of each of the pixels PX after alignment of the light emitting elements LD is completed, and may be disposed on at least one side or a side of each sub-light emitting area SEA.

For example, each pixel unit PXU may include at least one separation area SPA disposed around the light emitting area EA. End portions of at least one electrode forming the pixel unit PXU (for example, end portions of the alignment electrodes ALE) may be disposed in each separation area SPA.

In an embodiment, the separation area SPA may be disposed above and below each sub-light emitting area SEA. The separation areas SPA of the pixels PX may be separated from each other, but the disclosure is not limited thereto. For example, the separation areas SPA disposed above or below the first, second, and third sub-light emitting areas SEA1, SEA2, and SEA3 may be integral with each other.

In an embodiment, each alignment electrode ALE may have an individual separated pattern for each pixel PX. For example, the first, second, and third alignment electrodes ALE1, ALE2, and ALE3 of each of the pixels PX may respectively have an individually separated pattern. However, the disclosure is not limited thereto. For example, in a structure in which the second pixel electrodes ELT2 of the pixels PX are commonly connected to the second power line PL2, the alignment electrodes ALE (for example, the third alignment electrodes ALE3 of the pixels PX) connected to the second pixel electrodes ELT2 may be integral with each other without being disconnected between the sub-light emitting areas SEA adjacent to each other along the first direction DR1 and/or the second direction DR2.

In an embodiment, the first alignment electrode ALE1 may be connected to a pixel circuit PXC and/or the first power line PL1 of the corresponding pixel PX disposed in a pixel circuit layer (for example, a circuit layer PCL of FIG. 7) through a first contact portion CNT1. The first alignment signal may be supplied to the first alignment electrode ALE1 (or the first alignment wire) through at least one wire (for example, the first power line PL1) disposed in the pixel circuit layer.

The first contact portion CNT1 may include at least one contact hole and/or a via hole. In an embodiment, the first contact portion CNT1 may be positioned in the non-light emitting area NEA positioned around each sub-light emitting area SEA, but the position of the first contact portion CNT1 is not limited thereto. For example, the first contact portion CNT1 may be disposed to each sub-light emitting area SEA or separation area SPA. In FIG. 6, the first contact portions CNT1 are substantially disposed at a same position in the first, second, and third sub-light emitting areas SEA1, SEA2, and SEA3, but the positions of the first contact portions CNT1 may be variously changed according to the structure of the pixel circuit PXC and the light emitting part EMU of each pixel PX. For example, in case that it is possible to electrically connect each first alignment electrode ALE1 and a circuit element (for example, the first transistor M1 and/or the capacitor Cst of FIG. 4 and FIG. 5) and/or wire (for example, the first power line PL1) connected to the first alignment electrode ALE1, the position of the first contact portion CNT1 is not particularly limited.

In an embodiment, the second alignment electrode ALE2 may be connected to the second power line PL2 positioned in the pixel circuit layer through the second contact portion CNT2. The second alignment signal may be supplied to the second alignment electrode ALE2 (or the second alignment wire) through the second power line PL2.

Similarly, the third alignment electrode ALE3 may be connected to the second power line PL2 positioned in the pixel circuit layer through the third contact portion CNT3. The second alignment signal may also be supplied to the third alignment electrode ALE3 (or the third alignment wire) through the second power line PL2.

The second contact portion CNT2 and the third contact portion CNT3 may each include at least one contact hole and/or via hole. In an embodiment, the second contact portion CNT2 and the third contact portion CNT3 may be positioned in the non-light emitting area NEA positioned around each sub-light emitting area SEA, but the positions of the second contact portion CNT2 and the third contact portion CNT3 are not limited thereto. For example, the second contact portion CNT2 and the third contact portion CNT3 may be disposed to each sub-light emitting area SEA or separation area SPA. In FIG. 6, the second contact portions CNT2 and the third contact portions CNT3 are substantially disposed at a same position in the first, second, and third sub-light emitting areas SEA1, SEA2, and SEA3, but the positions of the second contact portions CNT2 and the third contact portions CNT3 may be variously changed according to the structure of the pixel circuit PXC and the light emitting part EMU of each pixel PX.

At least one first light emitting element LD1 may be arranged or disposed between the first alignment electrode ALE1 and the second alignment electrode ALE2. For example, first light emitting elements LD1 may be arranged or disposed between the first alignment electrode ALE1 and the second alignment electrode ALE2.

Each of the first light emitting elements LD1 may or may not overlap the first alignment electrode ALE1 and/or the second alignment electrode ALE2. The first end portion EP1 of the first light emitting element LD1 may be disposed to be adjacent to the first alignment electrode ALE1, and the second end portion EP2 of the first light emitting element LD1 may be disposed to be adjacent to the second alignment electrode ALE2.

The first end portion EP1 of the first light emitting element LD1 may be electrically connected to the first pixel electrode ELT1. In an embodiment, the first end EP1 of the first light emitting element LD1 may be electrically connected to the first alignment electrode ALE1 through the first pixel electrode ELT1, and may be electrically connected to the pixel circuit PXC and/or the first power line PL1 through the first alignment electrode ALE1.

The second end portion EP2 of the first light emitting element LD1 may be electrically connected to an intermediate electrode IET and/or the second pixel electrode ELT2. In an embodiment, the second end portion EP2 of the first light emitting element LD1 may be electrically connected to the intermediate electrode IET. The second end portion EP2 of the first light emitting element LD1 may be electrically connected to the second power line PL2 sequentially via the intermediate electrode IET, at least one second light emitting element LD2, the second pixel electrode ELT2, and the third alignment electrode ALE3.

At least one second light emitting element LD2 may be arranged or disposed between the first alignment electrode ALE1 and the third alignment electrode ALE3. For example, second light emitting elements LD2 may be arranged or disposed between the first alignment electrode ALE1 and the third alignment electrode ALE3.

Each of the second light emitting elements LD2 may or may not overlap the first alignment electrode ALE1 and/or the third alignment electrode ALE3. The first end portion EP1 of the second light emitting element LD2 may be disposed to be adjacent to the first alignment electrode ALE1, and the second end portion EP2 of the second light emitting element LD2 may be disposed to be adjacent to the third alignment electrode ALE3.

The first end portion EP1 of the second light emitting element LD2 may be electrically connected to the intermediate electrode IET. The second end portion EP2 of the second light emitting element LD2 may be electrically connected to the second pixel electrode ELT2. In an embodiment, the second end portion EP2 of the second light emitting element LD2 may be electrically connected to the third alignment electrode ALE3 through the second pixel electrode ELT2, and may be electrically connected to the second power line PL2 through the third alignment electrode ALE3.

In an embodiment, each light emitting element LD may be an ultra-small inorganic light emitting element using a material having an inorganic crystalline structure (for example, having a small size in a range of nanometers to micrometers). For example, each light emitting element LD may be an ultra-small inorganic light emitting element manufactured by growing a nitride-based semiconductor. However, the type, size, shape, structure, and/or number of light emitting elements LD forming each light emitting part EMU may be changed.

The light emitting elements LD may be prepared in a form dispersed in a solution to be supplied to each light emitting area EA through an inkjet method or a slit coating method. In case that the alignment signals are applied to the alignment electrodes ALE (or alignment lines) of the pixels PX simultaneously with or after the supply of the light emitting elements LD, an electric field is formed between the alignment electrodes ALE so that the light emitting elements LD may be aligned. After the light emitting elements LD are aligned, the solvent may be removed through a drying process or the like within the spirit and the scope of the disclosure.

The first pixel electrode ELT1 may be disposed on the first end portions EP1 of the first light emitting elements LD1, and may be electrically connected to the first end portions EP1 of the first light emitting elements LD1. As an example, the first pixel electrode ELT1 may be disposed on or directly disposed on the first end portions EP1 of the first light emitting elements LD1 to contact the first end portions EP1 of the first light emitting elements LD1.

In an embodiment, the first pixel electrode ELT1 may overlap the first alignment electrode ALE1, and may be electrically connected to the first alignment electrode ALE1 through a fourth contact portion CNT4. The first pixel electrode ELT1 may be electrically connected to the pixel circuit PXC and/or the first power line PL1 of the corresponding pixel PX through the first alignment electrode ALE1. In an embodiment, the first pixel electrode ELT1 may be electrically connected to the pixel circuit PXC and/or the first power line PL1 of the corresponding pixel PX without through the first alignment electrode ALE1.

The intermediate electrode IET may be disposed on the second end portions EP2 of the first light emitting elements LD1 and the first end portions EP1 of the second light emitting elements LD2, and may be electrically connected to the second end portions EP2 of the first light emitting elements LD1 and the first end portions EP1 of the second light emitting elements LD2. For example, the intermediate electrode IET may be disposed on or directly disposed on the second end portions EP2 of the light emitting elements LD1 and the first end portions EP1 of the second light emitting elements LD2 to contact the second end portions EP2 of the first light emitting elements LD1 and the first end portions EP1 of the second light emitting elements LD2. In an embodiment, the intermediate electrode IET may overlap a portion of each of the first and second alignment electrodes ALE1 and ALE2, but is not limited thereto.

The second pixel electrode ELT2 may be disposed on the second end portions EP2 of the second light emitting elements LD2, and may be electrically connected to the second end portions EP2 of the second light emitting elements LD2. As an example, the second pixel electrode ELT2 may be disposed on or directly disposed on the second end portions EP2 of the second light emitting elements LD2 to contact the second end portions EP2 of the second light emitting elements LD2.

In an embodiment, the second pixel electrode ELT2 may overlap the third alignment electrode ALE3, and may be electrically connected to the third alignment electrode ALE3 through a fifth contact portion CNT5. The second pixel electrode ELT2 may be electrically connected to the second power line PL2 through the third alignment electrode ALE3. In an embodiment, the second pixel electrode ELT2 may be electrically connected to the second power line PL2 without passing through the third alignment electrode ALE3.

The pixel electrodes (ELT) (for example, first pixel electrode ELT1, intermediate electrode IET, and second pixel electrode ELT2) may be at least formed in each sub-light emitting area SEA. In an embodiment, at least one pixel electrode ELT may extend from each sub-light emitting area SEA to the non-light emitting area NEA and/or the separation area SPA. For example, the first and second pixel electrodes ELT1 and ELT2 may extend from each sub-light emitting area SEA to the non-light emitting area NEA and the separation area SPA, and may be electrically connected to the first and third alignment electrodes ALE1 and ALE3 in the separation area SPA, respectively. The intermediate electrode IET may be formed only in each sub-light emitting area SEA, or a portion thereof may be positioned in the non-light emitting area NEA. The position, size, shape, and mutual disposition structure of the pixel electrodes ELT, and/or the positions of the fourth and fifth contact portions CNT4 and CNT5 may be variously changed according to embodiments.

The bank patterns BNP (also referred to as "patterns" or "wall patterns") may be disposed under or below the electrodes so that they overlap some or a number of the electrodes disposed in the sub-light emitting areas SEA. For example, the bank patterns BNP may partially overlap the alignment electrodes ALE disposed in the sub-light emitting areas SEA of the pixel unit PXU. In an embodiment, at least one bank pattern BNP may extend to the non-light emitting area NEA around the light emitting area EA, but is not limited thereto.

In an embodiment, the bank patterns BNP may include hydrophobic surfaces. For example, by forming the bank patterns BNP themselves in hydrophobic patterns by using a hydrophobic material, or by forming a hydrophobic film made of a hydrophobic material on the bank patterns BNP, the bank patterns BNP may be formed to have hydrophobic surfaces. However, in the disclosure, the material and/or surface characteristic of the bank patterns BNP are not particularly limited.

The non-light emitting area NEA may be disposed around each light emitting area EA and/or each separation area SPA. A first bank BNK1 may be disposed in the non-light emitting area NEA.

The first bank BNK1 may include a first opening OPA1 corresponding to the light emitting area EA of each pixel unit PXU, and may surround the light emitting area EA. The first bank BNK1 may include second openings OPA2 corresponding to the separation areas SPA, and may surround the separation areas SPA. For example, the first bank BNK1 may include openings OPA corresponding to each light emitting area EA and each separation area SPA.

In an embodiment, the first opening OPA1 may be formed to include the sub-light emitting areas SEA (for example, the first, second, and third sub-light emitting areas SEA1, SEA2, and SEA3) corresponding to the pixels PX forming each pixel unit PXU. For example, by integrally opening the first bank BNK1 to include the sub-light emitting areas SEA of each pixel unit PXU, the first opening OPA1 of each pixel unit PXU may be formed. Compared to an embodiment in which openings are formed individually corresponding to each sub-light emitting area SEA, an area and/or volume of the light emitting area EA may be increased. For example, in an inkjet process or slit coating process for supplying the light emitting elements LD, a volume amount of light emitting element ink that may be accommodated in each light emitting area EA forming each inkjet area may be increased. In an embodiment, the first, second, and second pixels PX1, PX2, and PX3 may include the light emitting elements LD of a same color as each other. For example, the first, second, and second pixels PX1, PX2, and PX3 may include light emitting elements LD (for example, blue light emitting elements) of substantially a same type and/or color. The shape, size, and/or position of the first opening OPA1 may vary according to embodiments. For example, in an embodiment, first openings OPA1 that are respectively correspond to the first, second, and third sub-light emitting areas SEA1, SEA2, and SEA3 may be formed, so as to individually surround the first, second, and third sub-light emitting areas SEA1, SEA2, and SEA3.

The first bank BNK1 may include at least one light blocking and/or reflective material. For example, the first bank BNK1 may include at least one of a black matrix material and/or a color filter material of a specific or given color. The first bank BNK1 may define each light emitting area EA in which the light emitting elements LD should be supplied at the step of supplying the light emitting elements LD to each pixel unit PXU.

In an embodiment, the first bank BNK1 may include a hydrophobic surface. For example, by forming the first bank BNK1 itself in a hydrophobic pattern by using a hydrophobic material, or by forming a hydrophobic film made of a hydrophobic material on the first bank BNK1, the first bank BNK1 may be formed to have the hydrophobic surface. For example, the first bank BNK1 may be formed by using a hydrophobic organic insulating material having a large contact angle, such as polyacrylate, and accordingly, the first bank BNK1 may be formed in a hydrophobic pattern. Accordingly, the light emitting element ink may stably flow into the light emitting area EA.

Figure 7:
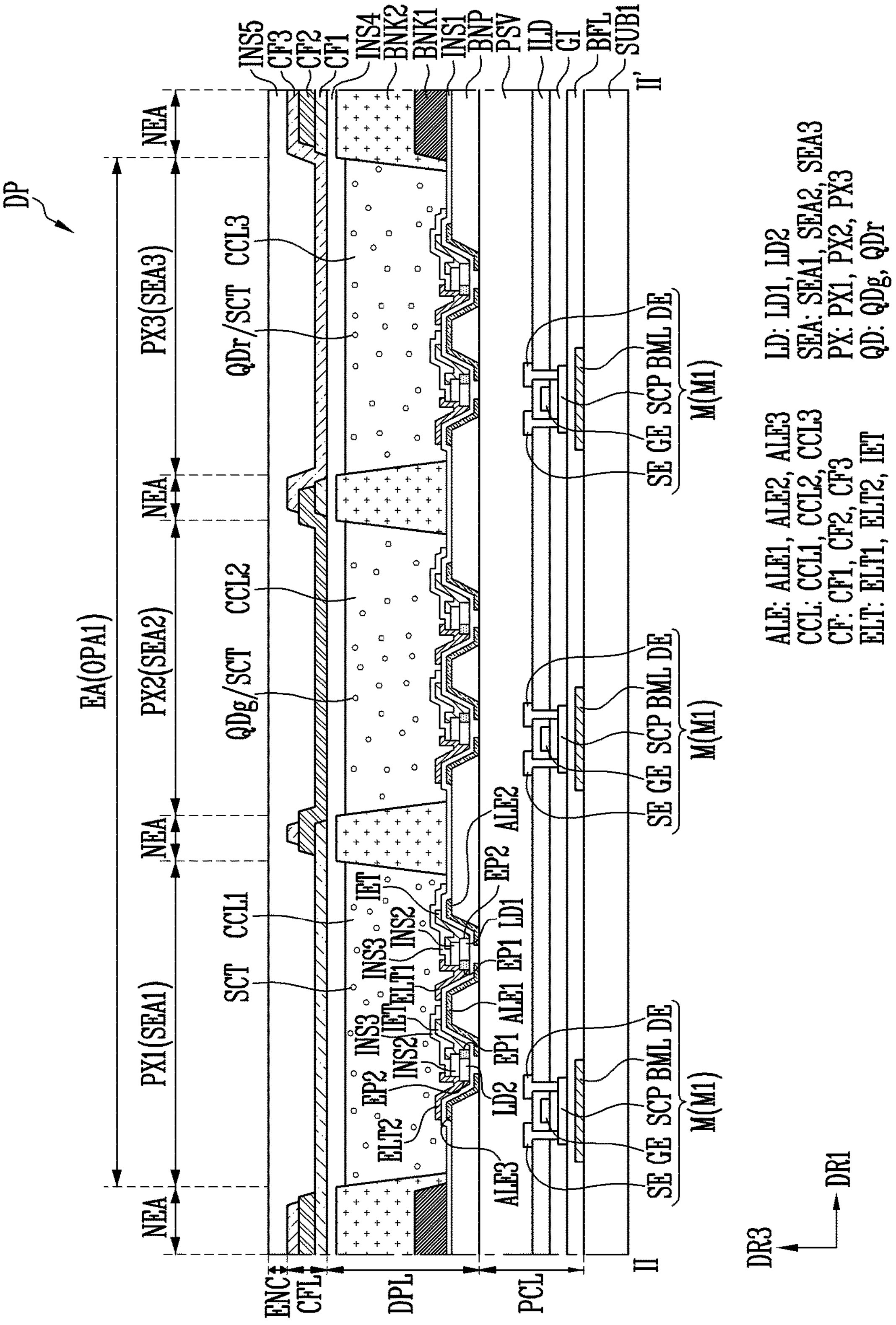
FIG. 7 to FIG. 9 respectively illustrate a schematic cross-sectional view of a display device according to an embodiment.
Figure 8:
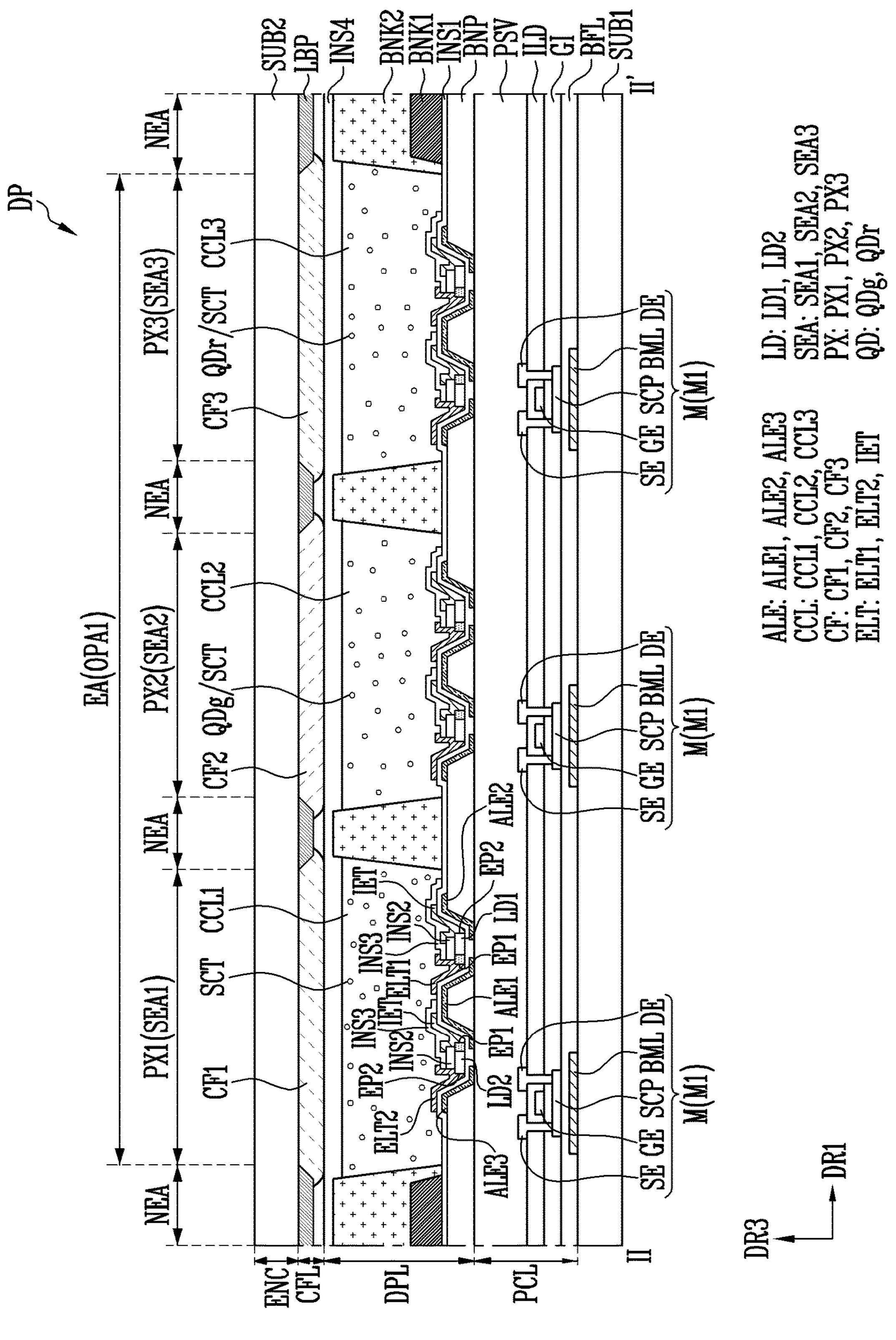
Figure 9:
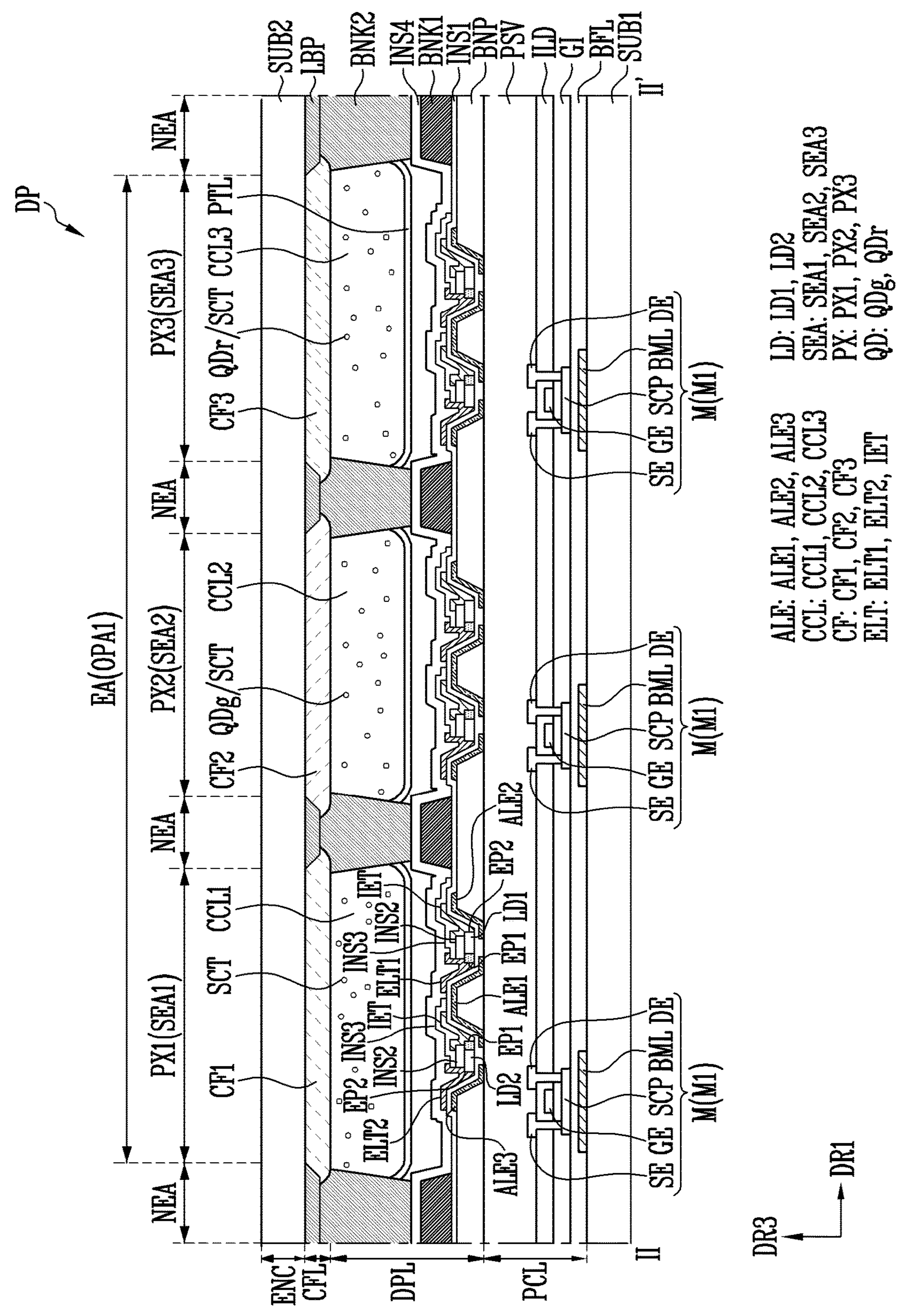

FIG. 7 to FIG. 9 respectively illustrate a schematic cross-sectional view of a display device DD according to an embodiment. For example, FIG. 7 to FIG. 9 illustrate schematic cross-sectional views of the display part DP taken along line II-II' of FIG. 6 according to embodiments different from each other.

FIG. 7 to FIG. 9 illustrate, as an example of circuit elements that may be disposed on the pixel circuit layer PCL of the display part DP, one transistor M included in each pixel circuit PXC (for example, the first transistor M1 including the bottom metal layer BML). Other circuit elements forming each pixel circuit PXC and wires connected to each pixel PX may be further disposed in the pixel circuit layer PCL.

First, referring to FIG. 3 to FIG. 7, the display part DP may include a first substrate SUB1, a pixel circuit layer PCL, and a display element layer DPL. The pixel circuit layer PCL and the display element layer DPL may be disposed to overlap each other on one surface or a surface of the first substrate SUB1. For example, the pixel circuit layer PCL and the display element layer DPL may be sequentially disposed on one surface or a surface of the first substrate SUB1.

The display part DP may further include a color filter layer CFL and/or an encapsulation layer ENC (or a passivation layer) disposed on the display element layer DPL. In an embodiment, the color filter layer CFL and/or the encapsulation layer ENC may be formed on or directly formed on one surface or a surface of the first substrate SUB1 on which the pixel circuit layer PCL and the display element layer DPL are formed, but embodiments are not limited thereto.

The first substrate SUB1 may be a rigid substrate or a flexible film-type substrate. The first substrate SUB1 may be a single-layered or multi-layered substrate or film.

The pixel circuit layer PCL may be provided on one surface or a surface of the first substrate SUB1. The pixel circuit layer PCL may include circuit elements forming the pixel circuits PXC of the pixels PX. For example, the pixel circuit layer PCL may include the pixel circuits PXC of the first, second, and third pixels PX1, PX2, and PX3 formed in each unit pixel area corresponding to each pixel unit PXU, and the pixel circuits PXC may include circuit elements in addition to respective first transistors M1. Each first transistor M1 may be electrically connected to at least one electrode (for example, the first alignment electrode ALE1 and/or the first pixel electrode ELT1) forming the light emitting part EMU of each pixel PX through the first contact part CNT1 of FIG. 6.

The pixel circuit layer PCL may include wires connected to the pixels PX. For example, the pixel circuit layer PCL may include the scan lines SL, the data lines DL, and the sensing lines SENL, and the first and second power lines PL1 and PL2 that are electrically connected to the pixel circuit PXC and/or the light emitting part EMU of each of the pixels PX.

The pixel circuit layer PCL may include insulating layers. For example, the pixel circuit layer PCL may include a buffer layer BFL, a gate insulating layer GI, an interlayer insulating layer ILD, and/or a passivation layer PSV, sequentially disposed on one surface or a surface of the first substrate SUB1.

The pixel circuit layer PCL is disposed on the first substrate SUB1, and may include a first conductive layer including the bottom metal layers BML of the first transistors M1. For example, the first conductive layer may be disposed between the first substrate SUB1 and the buffer layer BFL, and may include lower metal layers BML of the first transistors M1 included in the pixels PX. The bottom metal layers BML of the first transistors M1 may overlap the gate electrodes GE and the semiconductor patterns SCP of the first transistors M1.

The first conductive layer may further include at least one wire. For example, the first conductive layer may include at least some or a number of wires extending in the second direction DR2 in the display part DP.

The buffer layer BFL may be disposed on one surface or a surface of the first substrate SUB1 including the first conductive layer. The buffer layer BFL may prevent impurities from diffusing into each circuit element.

A semiconductor layer may be disposed on the buffer layer BFL. The semiconductor layer may include the semiconductor patterns SCP of the transistors M. Each semiconductor pattern SCP may include a channel area overlapping a gate electrode GE of the corresponding transistor M, and first and second conductive areas (for example, source and drain areas) disposed at both sides of the channel area.

The gate insulating layer GI may be disposed on the semiconductor layer. A second conductive layer may be disposed on the gate insulating layer GI.

The second conductive layer may include the gate electrodes GE of the transistors M. The second conductive layer may further include one electrode of each of the capacitors Cst provided in the pixel circuits PXC. In case that at least one wire disposed on the display part DP is formed of a multilayer, the second conductive layer may further include at least one conductive pattern forming the at least one wire.

The interlayer insulating layer ILD may be disposed on the second conductive layer. A third conductive layer may be disposed on the interlayer insulating layer ILD.

The third conductive layer may include source electrodes SE and drain electrodes DE of the transistors M. Each source electrode SE may be connected to one area (for example, a source area) of the semiconductor pattern SCP included in the corresponding transistor M through at least one contact hole, and each drain electrode DE may be connected to the other area (for example, a drain area) of the semiconductor pattern SCP included in the corresponding transistor M through at least one other contact hole.

The third conductive layer may further include another electrode of the capacitors Cst and/or at least one wire provided in pixel circuits PXC. For example, the third conductive layer may include an upper electrode of each of the capacitors Cst, and/or at least some or a number of the wires extending in the first direction DR1 in the display part DP.

Each of the conductive pattern, the electrode, and/or the wire forming the first to third conductive layers may have conductivity by including at least one conductive material, but the material is not particularly limited. For example, each of the conductive pattern, the electrode, and/or the wire forming the first to third conductive layers may include one or more of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu), and, it may include various types of conductive materials.

The passivation layer PSV may be disposed on the third conductive layer. Each of the buffer layer BFL, the gate insulating layer GI, the interlayer insulating layer ILD and the passivation layer PSV may be formed as a single layer or multilayer, and may include at least one inorganic insulating material and/or organic insulating material. For example, each of the buffer layer BFL, the gate insulating layer GI, the interlayer insulating layer ILD, and the passivation layer PSV may include various types of organic inorganic insulating materials such as a silicon nitride ($SiN_x$), a silicon oxide ($SiO_x$), or a silicon oxynitride ($SiO_xN_y$). In an embodiment, the passivation layer PSV may include an organic insulating layer, and may flatten a surface of the pixel circuit layer PCL.

The display element layer DPL may be disposed on the passivation layer PSV.

The display element layer DPL may include the light emitting parts EMU of the pixels PX. For example, the display element layer DPL may include the alignment electrodes ALE, the light emitting elements LD, and the pixel electrodes ELT included in the light emitting part EMU of each pixel PX.

The display element layer DPL may further include insulating patterns and/or insulating layers, sequentially disposed on one surface or a surface of the first substrate SUB1 on which the pixel circuit layer PCL is formed. For example, the display element layer DPL may include bank patterns BNP, a first insulating layer INS1, a first bank BNK1, a second insulating layer INS2, a third insulating layer INS3, and a fourth insulating layer INS4. The display element layer DPL may further include a second bank BNK2 and a light conversion layer CCL.

The bank patterns BNP may be provided and/or formed on the passivation layer PSV. The bank patterns BNP may respectively overlap at least one alignment electrode ALE, and may be sequentially arranged or disposed along the first direction DR1 in each light emitting area EA.

A portion of each of the alignment electrodes ALE may protrude in an upper direction (for example, the third direction DR3) around the light emitting elements LD by the bank patterns BNP. It is possible to form a reflective protruding pattern around the light emitting elements LD by the bank patterns BNP and the alignment electrodes ALE thereon.

Accordingly, the light efficiency of the pixels PX may be increased.

The bank patterns BNP may include an inorganic insulating film made of an inorganic material or an organic insulating film made of an organic material. The bank patterns BNP may be single-layered or multi-layered. The alignment electrodes ALE of the light emitting parts EMU (for example, the first, second and third alignment electrodes ALE1, ALE2, and ALE3 forming each light emitting part EMU) may be formed on the bank patterns BNP.

The alignment electrodes ALE may include at least one conductive material. For example, the alignment electrodes ALE may include at least one metal of various metal materials including silver (Ag), magnesium (Mg), aluminum (Al), platinum (Pt), palladium (Pd), gold (Au), nickel (Ni), neodymium (Nd), iridium (Ir), chromium (Cr), titanium (Ti), molybdenum (Mo), and copper (Cu), or an alloy including the same; a conductive oxide such as an indium tin oxide (ITO), an indium zinc oxide (IZO), an indium tin zinc Oxide (ITZO), a zinc oxide (ZnO), an aluminum doped zinc oxide (AZO), a gallium doped zinc oxide (GZO), a zinc tin oxide (ZTO), a gallium tin oxide (GTO), and a fluorine doped tin oxide (FTO); and at least one conductive material among conductive polymers such as PEDOT, but are not limited thereto. For example, the alignment electrodes ALE may include other conductive materials in addition to a carbon nanotube or graphene. For example, the alignment electrodes ALE may have conductivity by including at least one of various conductive materials. The alignment electrodes ALE may include conductive materials that are the same as or similar or different from each other.

Each of the alignment electrodes ALE may a single layer or multilayer. For example, each alignment electrode ALE may include a reflective electrode layer including a reflective conductive material (for example, metal). Each alignment electrode ALE may optionally further include at least one of a transparent electrode layer disposed at upper and/or lower portions of the reflective electrode layer and a conductive capping layer covering or overlapping upper portions of the reflective electrode layer and/or the transparent electrode layer.

The first insulating layer INS1 may be disposed on the alignment electrodes ALE. In an embodiment, the first insulating layer INS1 may also include contact portions (for example, the fourth and fifth contact portions CNT4 and CNT5 in FIG. 6) for connecting the first and third alignment electrodes ALE1 and ALE3 to the first and second pixel electrodes ELT1 and ELT2, respectively. In an embodiment, the first insulating layer INS1 is entirely formed on the display part DP in which the alignment electrodes ALE are formed, and may include openings exposing a portion of each of the first and third alignment electrodes ALE1 and ALE3. The first and third alignment electrodes ALE1 and ALE3 may be connected to the first and second pixel electrodes ELT1 and ELT2, respectively, in an area in which contact portions may be formed in the first insulating layer INS1 (or in an area in which the first insulating layer INS1 may be opened). In an embodiment, the first insulating layer INS1 may be locally disposed only in a lower portion of an area in which the light emitting elements LD may be arranged or disposed.

The first insulating layer INS1 may be formed as a single layer or multilayer, and may include at least one inorganic insulating material and/or organic insulating material. In an embodiment, the first insulating layer INS1 may include at least one type of inorganic insulating material in addition to a silicon nitride ($SiN_x$), a silicon oxide ($SiO_x$), or a silicon oxynitride ($SiO_xN_y$).

As the alignment electrodes ALE are covered or overlapped by the first insulating layer INS1, it is possible to prevent the alignment electrodes ALE from being damaged in a subsequent process. It is possible to secure electrical stability of the alignment electrodes ALE.

The first bank BNK1 may be disposed on one surface or a surface of the first substrate SUB1 on which the alignment electrodes ALE and the first insulating layer INS1 are formed. In an embodiment, the first bank BNK1 may be integrally opened corresponding to the light emitting area EA of each pixel unit PXU including respective sub-light emitting areas SEA, and may be formed to surround the light emitting area EA of each pixel unit PXU. In an embodiment, the first bank BNK1 may have the first opening OPA1 individually opened corresponding to the first, second, and third sub-light emitting areas SEA1, SEA2, and SEA3, and may be formed to surround each of the first, second, and third sub-light emitting areas SEA1, SEA2, and SEA3. Each light emitting area EA (or each sub-light emitting area SEA) to which the light emitting elements LD are to be supplied may be defined and/or partitioned by the first bank BNK1.

The light emitting elements LD may be supplied to each light emitting area EA and/or each sub-light emitting area SEA surrounded by the first bank BNK1. The light emitting elements LD may be aligned between the alignment electrodes ALE by alignment signals applied to the alignment electrodes ALE (or alignment wires). For example, the light emitting elements LD supplied to each light emitting areas EA may be arranged or disposed between the first, second and third alignment electrodes ALE1, ALE2, and ALE3 of the first sub-light emitting area SEA1, between the first, second and third alignment electrodes ALE1, ALE2, and ALE3 of the second sub-light emitting area SEA2, and between the first, second and third alignment electrodes ALE1, ALE2, and ALE3 of the third sub-light emitting area SEA3.

In an embodiment, the light emitting elements LD arranged or disposed in the sub-light emitting areas SEA may be light emitting elements of a same first color. For example, the light emitting elements LD arranged or disposed in the first, second, and third sub-light emitting areas SEA1, SEA2, and SEA3 may all be blue light emitting elements emitting blue light.

For example, the first, second, and third pixels PX1, PX2, and PX3 may equally include the light emitting elements LD of the first color. However, a second light conversion layer CCL2 including light conversion particles of a second color (for example, green quantum dots QDg) (also referred to as "first light conversion particle(s)") may be disposed on the light emitting elements LD of the second pixel PX2, and a third light conversion layer CCL3 including light conversion particles of a third color (for example, red quantum dots QDr) (also referred to as "second light conversion particle(s)") may be disposed on the light emitting elements LD of the third pixel PX3. Accordingly, the second pixel PX2 may emit light of the second color, and the third pixel PX3 may emit light of the third color.

The second insulating layer INS2 (also referred to as an "insulating pattern") may be disposed on some or a number of the light emitting elements LD. In an embodiment, the second insulating layer INS2 may be locally disposed on one portion including a central portion of the light emitting elements LD so as to expose the first and second end portions EP1 and EP2 of the light emitting elements LD aligned between a pair of alignment electrodes ALE. In an embodiment, the second insulating layer INS2 is entirely formed in the pixel areas in which respective light emitting elements LD are disposed, and may be partially opened in areas including the upper portions of the first and second end portions EP1 and EP2 of the light emitting elements LD as needed. In case that the second insulating layer INS2 is formed on the light emitting elements LD, the light emitting elements LD may be stably fixed, and the pixel electrodes ELT that are disposed on the first and second end portions EP1 and EP2 of the light emitting elements LD may be stably separated.

The second insulating layer INS2 may be formed as a single layer or multilayer, and may include at least one inorganic insulating material and/or organic insulating material. For example, the second insulating layer INS2 may include a silicon nitride ($SiN_x$), a silicon oxide ($SiO_x$), a silicon oxynitride ($SiO_xN_y$), an aluminum oxide ($Al_xO_y$), or a photo resist (PR) material, and various types of organic or inorganic insulating materials.

The pixel electrodes ELT (for example, first pixel electrode ELT1, second pixel electrode ELT2, and intermediate electrode IET) may be formed on respective end portions of the light emitting elements LD, For example, the first and second end portions EP1 and EP2 thereof. For example, the first pixel electrode ELT1 may be disposed on the first end portion EP1 of the first light emitting element LD1, and the intermediate electrode IET may be disposed on the second end portion EP2 of the first light emitting element LD1. The intermediate electrode IET may be disposed on the first end portion EP1 of the second light emitting element LD2, and the second pixel electrode ELT2 may be disposed on the second end portion EP2 of the second light emitting element LD2.

The pixel electrodes ELT may be formed on the same or different layers. For example, the mutual positions of the first pixel electrode ELT1, the second pixel electrode ELT2, and the intermediate electrode IET and/or the formation orders thereof may be variously changed according to embodiments.

In the embodiments of FIG. 7, each intermediate electrode IET may be first formed on the second insulating layer INS2. The intermediate electrode IET is in contact with or direct contact with the second end portion EP2 of the first light emitting element LD1 and the first end portion EP1 of the second light emitting element LD2, so that it may be connected between the first light emitting element LD1 and the second light emitting element LD2, but embodiments are not limited thereto. Thereafter, the third insulating layer INS3 may be formed in each light emitting area EA to cover or overlap the intermediate electrode IET, and the first and second pixel electrodes ELT1 and ELT2 may be formed in each sub-light emitting area SEA in which the third insulating layer INS3 is formed. The first and second pixel electrodes ELT1 and ELT2 may be simultaneously or sequentially formed. In an embodiment, the first pixel electrode ELT1 may be connected to the first end portion EP1 of the first light emitting element LD1 by contacting or directly contacting the first end portion EP1 of the first light emitting element LD1, and the second pixel electrode ELT2 may be connected to the second end portion EP2 of the second light emitting element LD2 by contacting or directly contacting the second end portion EP2 of the second light emitting element LD2.

In an embodiment, the first and second pixel electrodes ELT1 and ELT2 may be first formed, and after at least one insulating layer is formed to cover or overlap the first and second pixel electrodes ELT1 and ELT2, each intermediate electrode IET may be formed on the insulating layer. In an embodiment, the first and second pixel electrodes ELT1 and ELT2 and the intermediate electrode IET of each pixel PX may be simultaneously formed on a same layer. The third insulating layer INS3 may be omitted.

In FIG. 4, in case that each pixel PX may include the light emitting part EMU having a parallel structure, the pixel PX may not include the intermediate electrode IET. The first pixel electrode ELT1 may be disposed on the first end portions EP1 of the light emitting elements LD, and the second pixel electrode ELT2 may be disposed on the second end portions EP2 of the light emitting elements LD.

The pixel electrodes ELT may include at least one conductive material. In an embodiment, the pixel electrodes ELT may include a transparent conductive material to allow light emitted from the light emitting elements LD to pass therethrough.

The light conversion layers CCL may be provided in respective sub-light emitting areas SEA to be disposed on the light emitting elements LD. The light conversion layers CCL may include at least one of the light conversion particles (for example, quantum dots QD) and/or the light scattering particles SCT provided to respective sub-light emitting areas SEA.

The display part DP may further include the second bank BNK2 that may include openings corresponding to respective sub-light emitting areas SEA and surrounds the sub-light emitting areas SEA. The second bank BNK2 may define and/or partition each sub-light emitting area EA in which each light conversion layer CCL is to be formed.

The second bank BNK2 may include a light blocking and/or reflective material including a black matrix material. The second bank BNK2 may include a same material or a similar material as or different material from the first bank BNK1. As the second bank BNK2 is disposed around the sub-emission areas SEA, the remaining area (for example, an area between the sub-light emitting areas SEA) in which the sub-light emitting areas SEA are excluded among respective light-emitting areas EA may be a non-light emitting area NEA.

The light conversion layer CCL may include light conversion particles QD (or wavelength and/or color conversion particles) that convert a wavelength and/or color of light emitted from the light emitting elements LD, and/or light scattering particles SCT that increases light output efficiency by scattering light emitted from the light emitting elements LD. For example, at least one type of light conversion particles QD (for example, red quantum dots QDr or green quantum dots QDg), and/or each light conversion layer CCL including the light scattering particles SCT may be provided in each sub-light emitting area SEA.

For example, the first light conversion layer CCL1 including the light scattering particles SCT may be provided on the light emitting elements LD of the first color disposed in the first sub-light emitting area SEA1, and a first color filter CF1 (for example, a blue color filter) that selectively transmits light of the first color may be disposed on the first light conversion layer CCL1. Accordingly, the first pixel PX1 may emit light of the first color (for example, blue light).

The second light conversion layer CCL2 including a quantum dot of a second color that converts light of the first color into light of the second color, for example, the green quantum dot QDg may be provided on the light emitting elements LD of the first color disposed in the second sub-light emitting area SEA2, and a second color filter CF2 (for example, a green color filter) that selectively transmits light of the second color may be disposed on the second light conversion layer CCL2. Accordingly, the second pixel PX2 may emit light of the second color. In an embodiment, the second light conversion layer CCL2 may further include the light scattering particles SCT. Accordingly, the light efficiency of the second pixel PX2 may be increased.

The third light conversion layer CCL3 including a quantum dot of a third color that converts light of the first color into light of the third color, for example, the red quantum dot QDr may be provided on the light emitting elements LD of the first color disposed in the third sub-light emitting area SEA3, and a third color filter CF3 (for example, a red color filter) that selectively transmits light of the third color may be disposed on the third light conversion layer CCL3. Accordingly, the third pixel PX3 may emit light of the third color. In an embodiment, the third light conversion layer CCL3 may further include the light scattering particles SCT. Accordingly, the light efficiency of the third pixel PX3 may be increased.

A fourth insulating layer INS4 may be provided between the light conversion layers CCL and the color filters CF. For example, the fourth insulating layer INS4 may be disposed on an uppermost layer of the display element layer DPL to cover or overlap the light conversion layers CCL and the second bank BNK2.

In an embodiment, the fourth insulating layer INS4 may include an organic and/or inorganic insulating film, and may substantially flatten a surface of the display element layer DPL. The fourth insulating layer INS4 may protect the light emitting parts EMU and the light conversion layers CCL.

The color filter layer CFL may be disposed on the fourth insulating layer INS4.

The color filter layer CFL may include color filters CF corresponding to the color of the pixels PX. For example, the color filter layer CFL may include the first color filter CF1 provided in the first sub-light emitting area SEA1 of the first pixel PX1, the second color filter CF2 provided in the second sub-light emitting area SEA2 of the second pixel PX2, and the third color filter CF3 provided in the third sub-light emitting area SEA3 of the third pixel PX3.

In an embodiment, the first, second, and third color filters CF1, CF2, and CF3 may be disposed to overlap each other in the non-light emitting area NEA between the sub-light emitting areas SEA to block light interference between the pixels PX. In an embodiment, the first, second, and third color filters CF1, CF2, and CF3 may be formed as individual patterns that are separated from each other on the first, second, and third sub-light emitting areas SEA1, SEA2, and SEA3, respectively, and a separate light blocking pattern (for example, a light blocking pattern LBP of FIG. 8) may be disposed between the first, second, and third color filters CF1, CF2, and CF3.

The encapsulation layer ENC may be disposed on the color filter layer CFL. The encapsulation layer ENC may include at least one organic and/or inorganic insulating layer including a fifth insulating layer INS5. The fifth insulating layer INS5 may be entirely formed on the display part DP to cover or overlap the pixel circuit layer PCL, the display element layer DPL, and/or the color filter layer CFL.

The fifth insulating layer INS5 may be formed as a single layer or multilayer, and may include at least one inorganic insulating material and/or organic insulating material. For example, the fifth insulating layer INS5 may include a silicon nitride ($SiN_x$), a silicon oxide ($SiO_x$), a silicon oxynitride ($SiO_xN_y$), or an aluminum oxide ($Al_xO_y$), and various types of organic or inorganic insulating materials.

Referring to FIG. 8, the encapsulation layer ENC may include a second substrate SUB2. The second substrate SUB2 may be a rigid substrate or a flexible film-type substrate. The second substrate SUB2 may be a single-layered or multi-layered substrate or film. The first substrate SUB1 and the second substrate SUB2 may include a same material or a similar material or may include different materials.

The color filter layer CFL may be provided on one surface or a surface of the second substrate SUB2 to face the display element layer DPL. For example, the first, second, and third color filters CF1, CF2, and CF3 may be formed on or directly formed and/or provided on one surface or a surface (for example, a lower surface) of the second substrate SUB2, and may be respectively disposed to face the first light conversion layer CCL1, the second light conversion layer CCL2, and the third light conversion layer CCL3.

In an embodiment, the first, second, and third color filters CF1, CF2, and CF3 may be provided in the first, second, and third sub-light emitting areas SEA1, SEA2, and SEA3, respectively, and the light blocking pattern LBP may be provided between the first, second, and third color filters CF1, CF2, and CF3. The light blocking pattern LBP may include openings corresponding to the first, second, and third sub-light emitting areas SEA1, SEA2, and SEA3.

Referring to FIG. 9, the light conversion layers CCL and the second bank BNK2 may be provided on one surface or a surface of the second substrate SUB2 provided with the color filters CF. For example, the first, second, and third light conversion layers CCL1, CCL2, and CCL3 may be formed and/or disposed on the first, second, and third color filters CF1, CF2, and CF3 on the second substrate SUB2, respectively. In an embodiment, a passivation layer PTL may be provided on a surface of each of the light conversion layers CCL. The second substrate SUB2 may be disposed on the first substrate SUB1 so that the light conversion layers CCL and the color filters CF face the light emitting parts EMU provided with the respective light emitting elements LD to be bonded to the first substrate SUB1.

As in the above-described embodiments, the first, second, and third pixels PX1, PX2, and PX3 include the light emitting elements LD having a same color as each other, and light conversion layers (for example, the second and third light conversion layers CCL2 and CCL3) including respective light conversion particles QD may be disposed in some or a number of pixels (for example, the second and third pixels PX2 and PX3). Accordingly, the first, second, and third pixels may emit light of different colors.

The light conversion layers CCL may be formed on or directly formed and/or provided on the first substrate SUB1 provided with the light emitting parts EMU of the pixels PX, or may be formed and/or provided on the second substrate SUB2 separate from the first substrate SUB1 and may be disposed on the light emitting parts EMU of the pixels PX.

As an amount of use of the pixels PX (for example, an accumulated use time and/or the light emitting luminance (or an accumulated grayscale value) of each of the pixels PX) increases, the light emitting elements LD and the light conversion particles QD may be degraded, so that light emitting efficiency may be lowered. For example, the pixels PX may be degraded to a degree corresponding to the amount of use thereof, and in case that the degradation of the pixels PX is not properly compensated, it is possible to emit light with a lower luminance even for a data signal corresponding to the same grayscale value.

The degradation characteristics of the pixels PX may vary according to the structure (or configuration) of each pixel PX and/or the structure of the display part DP. For example, the light emitting efficiency of the first pixels PX1 not including the light conversion particles QD may be reduced due to degradation of the light emitting elements LD, and the light emitting efficiency of the second and third pixels PX2 and PX3 including the light conversion particles QD may be reduced due to degradation of the light emitting elements LD and degradation of the light conversion particles QD. For example, compared to the first pixels PX1, the second and third pixels PX2 and PX3 may have a higher rate of decrease in luminance according to the use amount thereof. As distances between the light emitting elements LD and respective light conversion layers CCL are shorter, the degradation of the light conversion particles QD is accelerated, so that the degradation of the second and third pixels PX2 and PX3 are significantly increased. For example, as in the embodiment of FIG. 7 and FIG. 8, the display part DP having a structure in which the light conversion layers CCL are formed on or directly formed and/or disposed on the first substrate SUB1 provided with respective light emitting parts EMU may have a higher rate of decrease in luminance according to the amount of use of the second and third pixels PX2 and PX3, compared to the display unit DP having a structure in which the light conversion layers CCL are formed on or directly formed and/or disposed on the second substrate SUB2 as in the embodiment of FIG. 9.

Accordingly, it is necessary to more accurately predict the degradation of the pixels PX according to the structure of the display part DP and the pixels PX to compensate for the degradation of the pixels PX.

Figure 10:
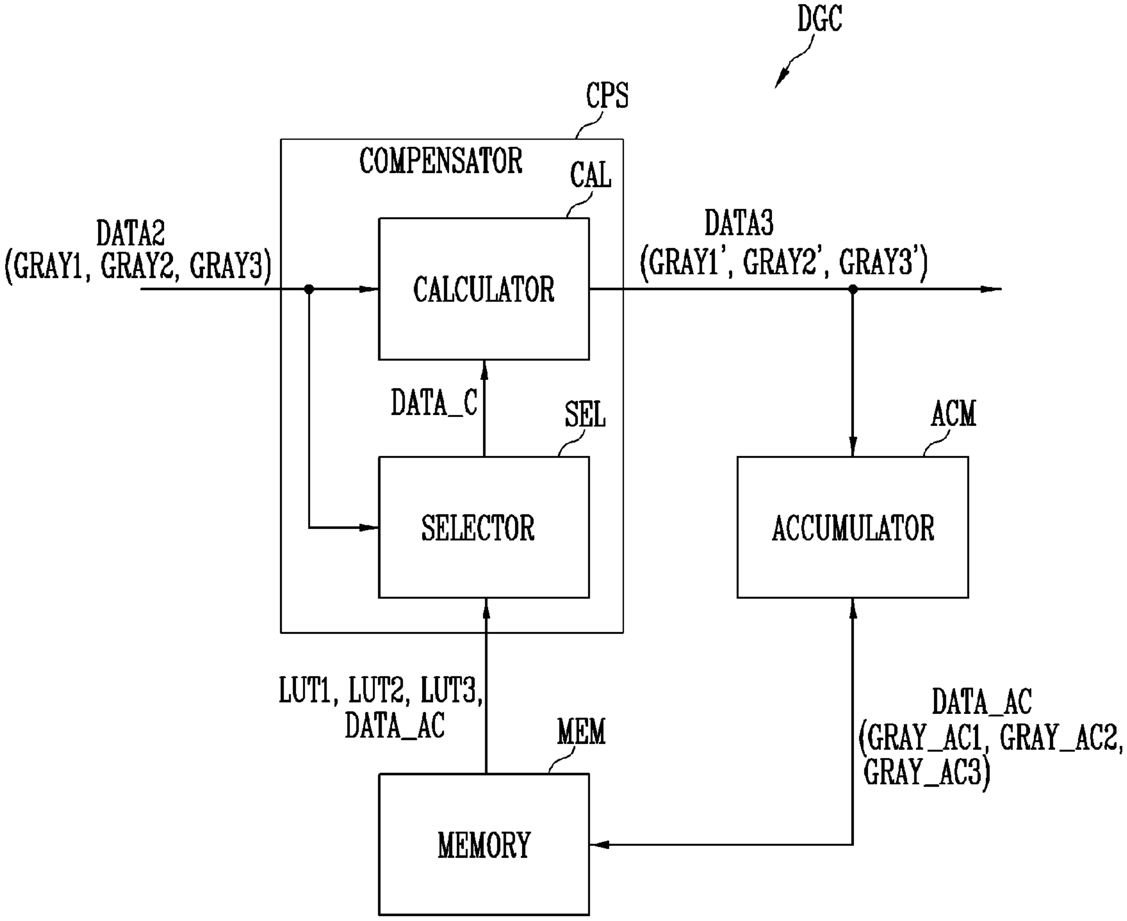
FIG. 10 illustrates a block diagram of a degradation compensator according to an embodiment.
Figure 11:
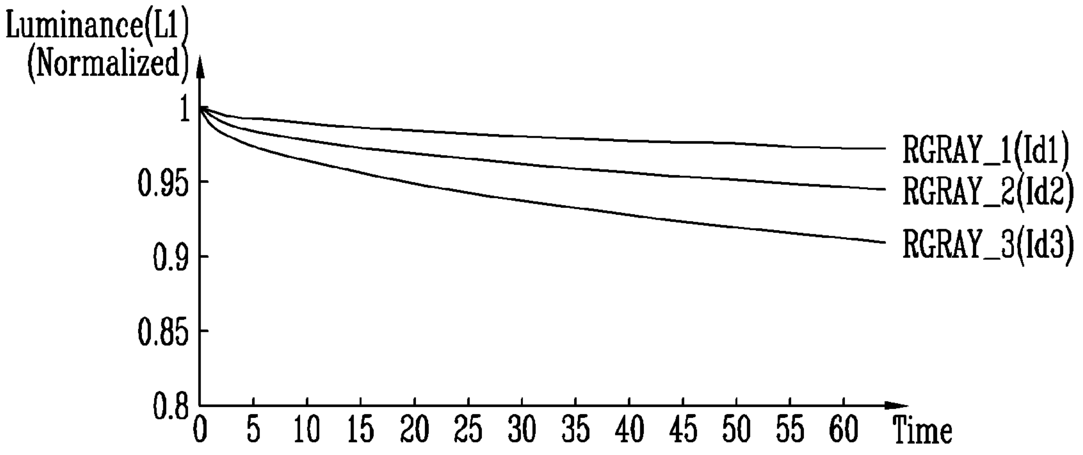
FIG. 11 illustrates a graph of an initial degradation curve of a first pixel.
Figure 12:
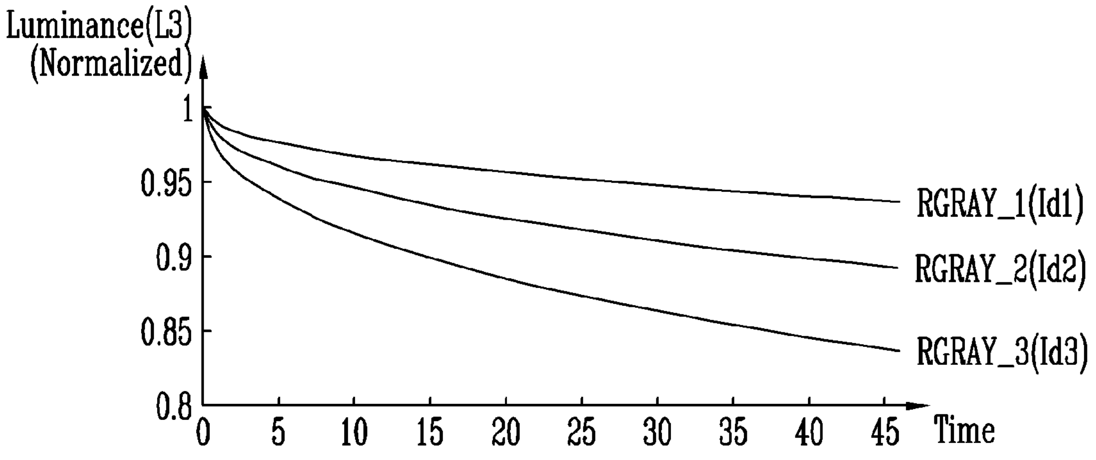
FIG. 12 illustrates a graph of an initial degradation curve of a third pixel.
Figure 13:
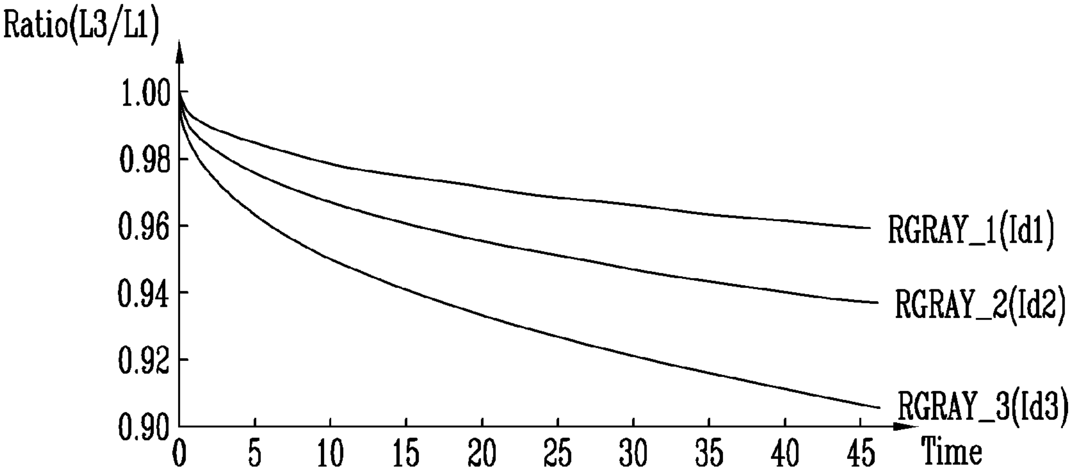
FIG. 13 illustrates a graph of a second estimated degradation curve modeled for second light conversion particles provided to a third pixel.
Figure 14:
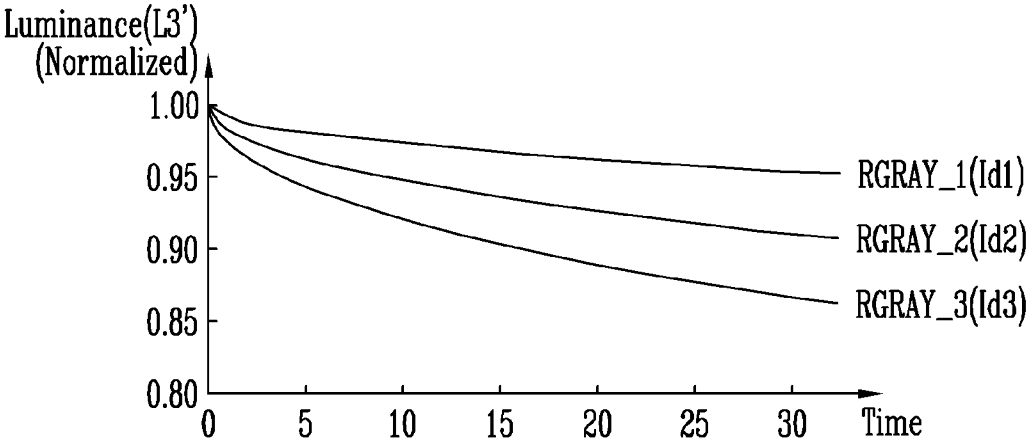
FIG. 14 illustrates a graph of a third degradation curve modeled for a third pixel.
Figure 15:
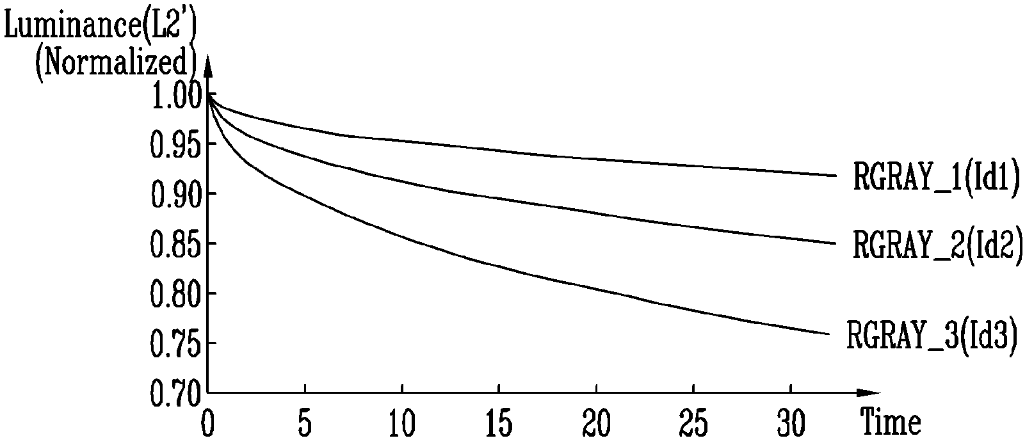
FIG. 15 illustrates a graph of a second degradation curve modeled for a second pixel.

FIG. 10 illustrates a block diagram of a degradation compensator DGC according to an embodiment. For example, FIG. 10 illustrates an example of the degradation compensator DGC of FIG. 3. FIG. 11 illustrates a graph of an initial degradation curve (or a first degradation curve) of the first pixel PX1. FIG. 12 illustrates a graph of an initial degradation curve of the third pixel PX3. FIG. 13 illustrates a graph of a second estimated degradation curve modeled for second light conversion particles QDr provided to the third pixel PX3. FIG. 14 illustrates a graph of a third degradation curve modeled for the third pixel PX3. FIG. 15 illustrates a graph of a second degradation curve modeled for the second pixel PX2.

Referring to FIG. 3 to FIG. 15, the degradation compensator DGC may include an accumulator ACM, a memory MEM, and a compensator CPS.

The accumulator ACM (for example, a use time calculator and/or stress calculator) may calculate an accumulated use time (or stress) of the pixels PX based on the compensated data DATA3. FIG. 10 may include a calculator (CAL), sellector (SEL), and DATA_C from the sellector (SEL) input to the calculator (CAL).

In an embodiment, the accumulator ACM may calculate the accumulated use time (or stress) of each of the pixels PX based on the compensated data DATA3 outputted from the degradation compensator DGC. For example, the accumulator ACM may accumulate a first compensated grayscale value GRAY1' (also referred to as a “first converted grayscale value”) of the first pixel PX1 included in the compensated data DATA3 to calculate an accumulated use time (also referred to as a “first accumulated use time”) of the first pixel PX1. Here, the first compensated grayscale value GRAY1' may be a grayscale value obtained by converting a first grayscale value GRAY1 corresponding to each first pixel PX1 by degradation compensation. Similarly, the accumulator ACM may accumulate a second compensated grayscale value GRAY2' (also referred to as a “second converted grayscale value”) of the second pixel PX2 included in the compensated data DATA3 to calculate an accumulated use time (also referred to as a “second accumulated use time”) of the second pixel PX2, and may accumulate a third compensated grayscale value GRAY3' (also referred to as a “third converted grayscale value”) of the third pixel PX3 included in the compensated data DATA3 to calculate an accumulated use time (also referred to as a “third accumulated use time”) of the third pixel PX3. Here, the second compensated grayscale value GRAY2' may be a grayscale value obtained by converting a second grayscale value GRAY2 corresponding to each second pixel PX2 by degradation compensation, and the third compensated grayscale value GRAY3' may be a grayscale value obtained by converting a third grayscale value GRAY3 corresponding to each third pixel PX3 by degradation compensation.

In an embodiment, the accumulator ACM may calculate the accumulated use time (or stress) of the pixels PX based on the image data DATA2 inputted to the degradation compensator DGC. In an embodiment, the accumulator ACM may individually accumulate the accumulated use time for each pixel PX, or may accumulate the accumulated use time for the pixels PX in a pixel group or block unit including of pixels PX.

In an embodiment, the accumulator ACM may accumulate the first compensated grayscale value GRAY1' every frame or every other period, or may calculate the first accumulated use time for the first pixel PX1 by averaging and downscaling the first compensated grayscale value GRAY1' outputted for a given or set time. The accumulator ACM may add the first accumulated use time to a first accumulated grayscale value GRAY_AC1, or may update the first accumulated grayscale value GRAY_AC1 based on the first accumulated use time. Here, the first accumulated grayscale value GRAY_AC1 may be included in an accumulated data DATA_AC (or use time data), and the accumulated data DATA_AC may be stored and updated in the memory MEM.

Similarly, the accumulator ACM may respectively calculate a second accumulated use time and a third accumulated use time for the second pixel PX2 and the third pixel PX3, and based on these, a second accumulated grayscale value GRAY_AC2 and a third accumulated grayscale value GRAY_AC3 may be updated. The second accumulated grayscale value GRAY_AC2 and the third accumulated grayscale value GRAY_AC3 may be included in the accumulated data DATA_AC and stored and updated in the memory MEM.

The memory MEM (or a storage unit) may store the accumulated data DATA_AC, and in response to a request of the accumulator ACM (for example, a request to provide the accumulated data DATA_AC), the accumulated data DATA_AC may be provided to the accumulator ACM. The accumulated data DATA_AC stored in the memory MEM may be updated in real time or periodically.

The memory MEM may store information related to the degradation characteristic of the pixels PX. For example, the memory MEM may include a first lookup table LUT1 in which degradation characteristic information of the first pixel PX1 is stored, a second lookup table LUT2 in which degradation characteristic information of the second pixel PX2 is stored, and a third lookup table LUT3 in which degradation characteristic information of the third pixel PX3 is stored.

In an embodiment, in order to detect degradation characteristics of the pixels PX provided in the display device DD having a specific or given structure (for example, a structure according to one of the embodiments of FIG. 7 to FIG. 9), at least one display device DD having the structure is selected as a sample, and through an aging or degradation test (for example, a degradation characteristic test) of the display device DD selected as the sample, the degradation characteristics of each of the first pixel PX1, the second pixel PX2, and the third pixel PX3 may be individually detected and/or calculated.

For example, while driving the first, second, and third pixels PX1, PX2, and PX3 so that a driving current corresponding to at least one reference grayscale value flows into the first, second, and third pixels PX1, PX2, and PX3 provided to the at least one display device DD for a period (for example, degradation evaluation period (or degradation inspection period) set to have a duration time), a change in luminance according to a time (for example, a luminance decrease rate) may be detected. Accordingly, an initial degradation curve of each of the first, second, and third pixels PX1, PX2, and PX3 may be obtained. In an embodiment, the initial degradation curve may correspond to a graph representing normalized luminance of each of the first, second, and third pixels PX1, PX2, and PX3 according to a time, and may be generated for at least one reference grayscale value.

For example, during the degradation evaluation period, a luminance change of the first pixel PX1 may be recorded in a form of a graph while driving the first pixel PX1 with first, second, and third reference grayscale values RGRAY_1, RGRAY_2, and RGRAY_3, respectively (or first, second, and third driving currents Id1, Id2, and Id3 corresponding to the first, second, and third reference grayscale values RGRAY_1, RGRAY_2, and RGRAY_3, respectively). Accordingly, as shown in FIG. 11, the initial degradation curve of the first pixel PX1 with respect to the first, second, and third reference grayscale values RGRAY_1, RGRAY_2, and RGRAY_3 may be obtained. In an embodiment, instantaneous luminance at each time point in the initial degradation curve of the first pixel PX1 may be represented as a ratio with respect to a maximum luminance in initial driving.

In a same manner, the initial degradation curves of the second and third pixels PX2 and PX3 may also be obtained. For example, during the degradation evaluation period, a luminance change of the third pixel PX3 may be recorded in a form of a graph while driving the third pixel PX3 with first, second, and third reference grayscale values RGRAY_1, RGRAY_2, and RGRAY_3, respectively (or first, second, and third driving currents Id1, Id2, and Id3 corresponding to the first, second, and third reference grayscale values RGRAY_1, RGRAY_2, and RGRAY_3, respectively). Accordingly, as shown in FIG. 12, the initial degradation curve of the third pixel PX3 with respect to the first, second, and third reference grayscale values RGRAY_1, RGRAY_2, and RGRAY_3 may be obtained. In an embodiment, instantaneous luminance at each time point in the initial degradation curve of the third pixel PX3 may be represented as a ratio with respect to a maximum luminance in initial driving. The initial degradation curve of the second pixel PX2 may also be obtained in a same manner.

In an embodiment, the first, second, and third pixels PX1, PX2, and PX3 include the light emitting elements LD of a same color, but may have different luminance reduction rates according to the presence and/or type of the light conversion particles QD. For example, in the second and third pixels PX2 and PX3 including the light emitting elements LD of the first color and respective light conversion particles QD, a decrease in luminance due to the degradation of the light emitting elements LD and a decrease in luminance due to the degradation of the light conversion particles QD may be accompanied. Accordingly, each of the second and third pixels PX2 and PX3 may include the light emitting elements LD of the first color, but may have a larger luminance reduction rate than the first pixel PX1 not including the light conversion particles QD.

The degradation characteristic of the first pixel PX1 may be due to the degradation of the light emitting elements LD provided in the first pixel PX1. Accordingly, as reference data for estimating the degradation of the first pixel PX1 due to actual driving of the display device DD, the initial degradation curve of the first pixel PX1 and/or a degradation coefficient (or degradation constant) detected from the initial degradation curve of the first pixel PX1 may be utilized. For example, the initial degradation curve of the first pixel PX1 detected during the degradation evaluation period may be modeled as the first degradation curve for the degradation compensation of the first pixel PX1.

In an embodiment, the first degradation curve may define the estimated luminance (or the luminance reduction rate) according to the accumulated use time of the first pixel PX1, and may be defined by Equation 1 below.

$$L1 = \exp\left[-\left(\frac{t_1}{\tau_1}\right)^{\beta_1}\right] \quad \text{(Equation 1)}$$

In Equation 1, L1 may be an estimated luminance (for example, a ratio of a reduced estimated luminance or a luminance decrease rate, with respect to the initial maximum luminance of the first pixel PX1) reduced according to the accumulated use time $t_1$ of the first pixel PX1, and $t_1$ may be an accumulated use time of the first pixel PX1. $\tau_1$ and $\beta_1$ are first degradation coefficients (or first degradation constants) experimentally determined by the initial degradation curve (for example, a degradation curve substantially the same as the first degradation curve) of the first pixel PX1 detected in the degradation evaluation of the first pixel PX1, and may be values that varies according to material characteristics of the light emitting elements LD provided to the first pixel PX1.

In an embodiment, the first degradation coefficients $\tau_1$ and $\beta_1$ extracted from the first degradation curve for each reference grayscale value (or a reference current corresponding thereto) may be stored in the first lookup table LUT1 of the memory MEM. As an example, the first lookup table LUT1 may store the first degradation coefficients $\tau_1$ and $\beta_1$ for each reference grays value as shown in Table 1 below.

TABLE 1

| LUT1 | | | |
|---|---|---|---|
| Reference grayscale value (or reference current) | RGRAY1 (Id1) | RGRAY2 (Id2) | RGRAY3 (Id3) |
| $\tau_1$ | $\tau_1$_G1 | $\tau_1$_G2 | $\tau_1$_G3 |
| $\beta_1$ | $\beta_1$_G1 | $\beta_1$_G2 | $\beta_1$_G3 |

The degradation characteristic of each of the second and third pixels PX2 and PX3 may be a characteristic in which the degradation of the light emitting elements LD and the light conversion particles QD (for example, the green quantum dots QDg or the red quantum dots QDr) provided in each of the second and third pixels PX2 and PX3 is reflected in a complex manner. Accordingly, in order to more accurately estimate the degradation of the second and third pixels PX2 and PX3 due to the actual driving of the display device DD, it should be possible to more accurately detect the degradation characteristic of each of the light emitting elements LD and the light conversion particles QD provided to the second and third pixels PX2 and PX3, and it should effectively compensate for the decrease in luminance of the second and third pixels PX2 and PX3 complexly occurring by the light emitting elements LD and the light conversion particles QD. Accordingly, in an embodiment, by comparing the initial degradation characteristic of the first pixel PX1 including a same type of light emitting elements LD (for example, blue light emitting elements) as the second and third pixels PX2 and PX3 and the initial degradation characteristic of each of the second and third pixels PX2 and PX3, a change in luminance due to the light conversion particles QD provided to the second and third pixels PX2 and PX3 may be estimated.

For example, the first initial degradation curve (or the first degradation curve) may be defined as in Equation 1, and an initial degradation curve of the third pixel PX3 may be defined in a same manner as in Equation 2 below.

$$L3 = \exp\left[-\left(\frac{t_3}{\tau_3}\right)^{\beta_3}\right] \quad \text{(Equation 2)}$$

In Equation 2, L3 may be a luminance (for example, a ratio of a reduced luminance or a luminance decrease rate, with respect to the initial maximum luminance of the third pixel PX3) reduced according to an accumulated use time $t_3$ of the third pixel PX3, and $t_3$ may be an accumulated use time of the third pixel PX3. $\tau_3$ and $\beta_3$ are degradation coefficients (or degradation constants) experimentally determined based on the initial degradation curve of the third pixel PX3 detected in the degradation evaluation of the third pixel PX3, and may be values that varies according to material characteristics of the light emitting elements LD and the second light conversion particles QDr provided to the third pixel PX3.

Thereafter, the degradation of the third pixel PX3 by the second light conversion particles QDr may be estimated by using the initial degradation curve of the first pixel PX1 and the initial degradation curve of the third pixel PX3. For example, a ratio of a luminance L3 of the third pixel PX3 according to the initial degradation curve of the third pixel PX3 with respect to a luminance L1 of the first pixel PX1 according to the initial degradation curve of the first pixel PX1 (for example, L3/L1) may be obtained, and a degradation curve corresponding to the ratio may be calculated. For example, by time, the luminance L3 of the third pixel PX3 according to the initial degradation curve of the third pixel PX3 is divided by the luminance L1 of the first pixel PX1 according to the initial degradation curve of the first pixel PX1 to illustrate it as a graph, so that an estimated degradation curve (hereinafter, referred to as a "second estimated degradation curve") due to the second light conversion particles QDr as shown in FIG. 13 may be obtained. For example, the second estimated degradation curve may be a degradation curve generated according to a ratio of the normalized luminance value L1 of the first initial degradation curve with respect to the first pixel PX1 and the normalized luminance value L3 of the third initial degradation curve with respect to the third pixel PX3. Here, it is assumed that the accumulated use time t1 of the first pixel PX1 is the same as the accumulated use time t3 of the third pixel PX3, and by substituting the accumulated use time t1 of the first pixel PX1 with the accumulated use time t3 of the third pixel PX3, the second estimated degradation curve with respect to the second light conversion particles QDr may be obtained.

In an embodiment, the second estimated degradation curve may be defined by Equation 3 below.

$$Lq2 = L3/L1 = \exp\left[-\left(\frac{t_3}{\tau_{q2}}\right)^{\beta_{q2}}\right] \quad \text{(Equation 3)}$$

In Equation 3, Lq2 may correspond to a luminance component changed by the second light conversion particles QDr among luminance reduced according to the accumulated use time $t_3$ of the third pixel PX3. $\tau_{q2}$ and $\beta_{q2}$ are third degradation coefficients (or third degradation constants) experimentally determined based on the estimated degradation curve of the second light conversion particles QDr, and may be a value that varies according to the material characteristics of the second light conversion particles QDr provided to the third pixel PX3. For example, the third degradation coefficients $\tau_{q2}$ and $\beta_{q2}$ may be degradation constants determined by the second estimated degradation curve. For example, the third degradation coefficients $\tau_{q2}$ and $\beta_{q2}$ may be degradation coefficients determined by the first initial degradation curve (the initial degradation curve of the first pixel PX1) detected in the degradation evaluation of the first pixel PX1 and the third initial degradation curve (the initial degradation curve of the third pixel PX3) detected in the degradation evaluation of the third pixel PX3.

Thereafter, by linking the estimated luminance L1 (for example, the estimated luminance due to degradation of the light emitting elements LD) of the first pixel PX1 according to the initial degradation curve of the first pixel PX1 to the estimated luminance Lq2 (or luminance reduction rate) of the third pixel PX3 by the degradation of the second light conversion particle QDr provided in the third pixel PX3 due to degradation of the second light conversion particles QDr, a third degradation curve with respect to the third pixel PX3 as shown in FIG. 14 may be defined.

For example, the third degradation curve with respect to the third pixel PX3 may be defined according to Equation 4 below, and the third degradation curve may be modeled as a degradation curve for compensation of the degradation of the third pixel PX3.

$$L3' = \exp\left[-\left(\frac{t_3}{\tau_1}\right)^{\beta_1} - \left(\frac{t_3}{\tau_{q2}}\right)^{\beta_{q2}}\right] \quad \text{(Equation 4)}$$

In Equation 4, L3' may be an estimated luminance (for example, a ratio of a reduced luminance or a luminance decrease rate, with respect to the initial maximum luminance of the third pixel PX3) that is decreased according to the accumulated use time $t_3$ of the third pixel PX3.

In a manner substantially equivalent to that of the third pixel PX3, the second degradation curve L2 of the second pixel PX2 as shown in FIG. 15 may be modeled.

For example, an initial degradation curve of the second pixel PX2 may be defined as in Equation 5 below.

$$L2 = \exp\left[-\left(\frac{t_2}{\tau_2}\right)^{\beta_2}\right] \quad \text{(Equation 5)}$$

In Equation 5, L2 may be a luminance (for example, a ratio of a reduced luminance or a luminance decrease rate, with respect to the initial maximum luminance of the second pixel PX2) reduced according to an accumulated use time $t_2$ of the second pixel PX2, and $t_2$ may be an accumulated use time of the third pixel PX3. $\tau_2$ and $\beta_2$ contact portion the second coefficients (or degradation constants) experimentally determined based on the initial degradation curve of the second pixel PX2 detected in the degradation evaluation of the second pixel PX2, and may be values that varies according to material characteristics of the light emitting elements LD and the first light conversion particles QDg provided to the second pixel PX2.

Thereafter, the degradation of the second pixel PX2 by the first light conversion particles QDg may be estimated by using the initial degradation curve of the first pixel PX1 and the initial degradation curve of the second pixel PX2. For example, a ratio of the luminance L2 of the second pixel PX2 according to the initial degradation curve of the second pixel PX2 with respect to the luminance L1 of the first pixel PX1 according to the initial degradation curve of the first pixel PX1 (for example, L2/L1) may be obtained, and a degradation curve corresponding to the ratio may be calculated. For example, by time, the luminance L3 of the second pixel PX2 according to the initial degradation curve of the second pixel PX2 is divided by the luminance L1 of the first pixel PX1 according to the initial degradation curve of the first pixel PX1 to illustrate it as a graph, so that an estimated degradation curve (hereinafter, referred to as a "first estimated degradation curve") due to the first light conversion particles QDg may be obtained. For example, the first estimated degradation curve may be a degradation curve generated according to a ratio of the normalized luminance value L1 of the first initial degradation curve with respect to the first pixel PX1 and the normalized luminance value L2 of the second initial degradation curve with respect to the second pixel PX2. Here, it is assumed that the accumulated use time $t_1$ of the first pixel PX1 is the same as the accumulated use time $t_2$ of the second pixel PX2, and by substituting the accumulated use time $t_1$ of the first pixel PX1 with the accumulated use time $t_3$ of the second pixel PX2, the first estimated degradation curve with respect to the first light conversion particles QDg may be obtained.

In an embodiment, the first estimated degradation curve may be defined by Equation 6 below.

$$Lq1 = L2/L1 = \exp\left[-\left(\frac{t_2}{\tau_{q1}}\right)^{\beta_{q1}}\right] \quad \text{(Equation 6)}$$

In Equation 6, Lq1 may correspond to a luminance component changed by the first light conversion particles QDg among luminance reduced according to the accumulated use time $t_2$ of the second pixel PX2. $\tau_{q1}$ and $\beta_{q1}$ are second degradation coefficients (or second degradation constants) experimentally determined based on the first estimated degradation curve of the first light conversion particles QDg, and may be a value that varies according to the material characteristics of the first light conversion particles QDg provided to the second pixel PX2. For example, the second degradation coefficients $\tau_{q1}$ and $\beta_{q1}$ may be degradation constants determined by the first estimated degradation curve. For example, the second degradation coefficients $\tau_{q1}$ and $\beta_{q1}$ may be degradation coefficients determined by the first initial degradation curve (the initial degradation curve of the first pixel PX1) detected in the degradation evaluation of the first pixel PX1 and the second initial degradation curve (the initial degradation curve of the second pixel PX2) detected in the degradation evaluation of the second pixel PX2.

Thereafter, by linking the estimated luminance L1 (for example, the estimated luminance due to degradation of the light emitting elements LD) of the first pixel PX1 according to the initial degradation curve of the first pixel PX1 to the estimated luminance Lq1 (or luminance reduction rate) of the second pixel PX2 by the degradation of the first light conversion particle QDg provided in the second pixel PX2 due to degradation of the second light conversion particles QDr, a second degradation curve with respect to the second pixel PX2 may be defined.

For example, the second degradation curve with respect to the second pixel PX2 may be defined according to Equation 7 below, and the second degradation curve may be modeled as a degradation curve for compensation of the degradation of the second pixel PX2.

$$L2' = \exp\left[-\left(\frac{t_2}{\tau_1}\right)^{\beta_1} - \left(\frac{t_2}{\tau_{q1}}\right)^{\beta_{q1}}\right] \quad \text{(Equation 7)}$$

In Equation 7, L2' may be an estimated luminance (for example, a ratio of a reduced luminance or a luminance decrease rate, with respect to the initial maximum luminance of the second pixel PX2) that is decreased according to the accumulated use time $t_2$ of the second pixel PX2.

In an embodiment, the second degradation coefficients $\tau_{q1}$ and $\beta_{q1}$ extracted from the estimated degradation curve of the first light conversion particles QDg for each reference grayscale value (or a reference current corresponding thereto) may be stored in the second lookup table LUT2 of the memory MEM, and the third degradation coefficients $\tau_{q2}$ and $\beta_{q2}$ extracted from the estimated degradation curves of the second light conversion particles QDr for each reference grayscale value (or a reference current corresponding thereto) may be stored in the third lookup table LUT3 of the memory MEM. As an example, the second lookup table LUT2 may store the second degradation coefficients $\tau_{q1}$ and $\beta_{q1}$ for each reference grayscale value as shown in Table 2 below, and the third lookup table LUT3 may store the third degradation coefficients $\tau_{q2}$ and $\beta_{q2}$ for each reference grayscale value as shown in Table 3 below.

TABLE 2

| LUT2 | | | |
|---|---|---|---|
| Reference grayscale value (or reference current) | RGRAY1 (Id1) | RGRAY2 (Id2) | RGRAY3 (Id3) |
| $\tau_{q1}$ | $\tau_{q1}$_G1 | $\tau_{q1}$_G2 | $\tau_{q1}$_G3 |
| $\beta_{q1}$ | $\beta_{q1}$_G1 | $\beta_{q1}$_G2 | $\beta_{q1}$_G3 |

TABLE 3

| LUT3 | | | |
|---|---|---|---|
| Reference grayscale value (or reference current) | RGRAY1 (Id1) | RGRAY2 (Id2) | RGRAY3 (Id3) |
| $\tau_{q2}$ | $\tau_{q2}$_G1 | $\tau_{q2}$_G2 | $\tau_{q2}$_G3 |
| $\beta_{q2}$ | $\beta_{q2}$_G1 | $\beta_{q2}$_G2 | $\beta_{q2}$_G3 |

Accordingly, the first, second, and third lookup tables LUT1, LUT2, and LUT3 may store information related to the first, second, and third degradation curves modeled according to the degradation characteristics of the first, second, and third pixels PX1, PX2, and PX3, respectively.

The first, second, and third degradation coefficients $\tau_1$, $\tau_{q1}$, $\tau_{q2}$, $\beta_1$, $\beta_{q1}$, and $\beta_{q2}$ for the remaining grayscale values not stored in the first, second, and third lookup tables LUT1, LUT2, and LUT3 (for example, the remaining grayscale values except for the reference grayscale values RGRAY1, RGRAY2, RGRAY3) may be obtained through a method such as interpolation.

The memory MEM may provide the first, second, and third lookup tables LUT1, LUT2, and LUT3 (for example, information stored in the first, second, and third lookup tables LUT1, LUT2, and LUT3) to the compensator CPS in response to the request of the compensator CPS. The memory MEM may provide the accumulated data DATA_AC to the compensator CPS in response to the request of the compensator CPS.

The compensator CPS may compensate the image data DATA2 based on the accumulated data DATA_AC and the first, second, and third lookup tables LUT1, LUT2, and LUT3 to generate the compensated data DATA3.

For example, the compensator CPS may compensate the first grayscale value GRAY1 corresponding to the first pixel PX1 based on the first accumulated grayscale value GRAY_AC1 (and/or the accumulated use time of the first pixel PX1) and the first lookup table LUT1 to generate (for example, calculate) the first compensated grayscale value GRAY1'. For example, the compensator CPS may use the first accumulated grayscale value GRAY_AC1 (and/or the accumulated use time of the first pixel PX1) and the first degradation coefficients $\tau_1$ and $\beta_1$ stored in the first lookup table LUT1 to estimate a change in luminance due to the degradation of the first pixel PX1, and may convert the first grayscale value GRAY1 so that the change in luminance of the first pixel PX1 may be compensated.

The compensator CPS may compensate the second grayscale value GRAY2 corresponding to the second pixel PX2 based on the second accumulated grayscale value GRAY_AC2 (and/or the accumulated use time of the second pixel PX2), the first lookup table LUT1, and the second lookup table LUT2 to generate (for example, calculate) the second compensated grayscale value GRAY2'. For example, the compensator CPS may use the second accumulated grayscale value GRAY_AC2 (and/or the accumulated use time of the second pixel PX2), the first degradation coefficients $\tau_1$ and $\beta_1$ stored in the first lookup table LUT1, and the second degradation coefficients $\tau_{q1}$ and $\beta_{q1}$ stored in the second lookup table LUT2 to estimate a change in luminance due to the degradation of the second pixel PX2, and may convert the second grayscale value GRAY2 so that the change in luminance of the second pixel PX2 may be compensated.

Similarly, the compensator CPS may compensate the third grayscale value GRAY3 corresponding to the third pixel PX3 based on the third accumulated grayscale value GRAY_AC3 (and/or the accumulated use time of the third pixel PX3), the first lookup table LUT1, and the third lookup table LUT3 to generate (for example, calculate) the third compensated grayscale value GRAY3'. For example, the compensator CPS may use the third accumulated grayscale value GRAY_AC3 (and/or the accumulated use time of the third pixel PX3), the first degradation coefficients $\tau_1$ and $\beta_1$ stored in the first lookup table LUT1, and the third degradation coefficients $\tau_{q2}$ and $\beta_{q2}$ stored in the third lookup table LUT3 to estimate a change in luminance due to the degradation of the third pixel PX3, and may convert the third grayscale value GRAY3 so that the change in luminance of the third pixel PX3 may be compensated.

In an embodiment, the compensator CPS may generate the first, second, and third compensated grays values GRAY1', GRAY2', and GRAY3' by converting the first, second, and third grayscale values GRAY1, GRAY2, and GRAY3 according to pre-stored compensation value information (for example, compensation value data provided in a form of a lookup table, and/or an equation, etc., within the spirit and the scope of the disclosure).

The first, second, and third compensated grayscale values GRAY1', GRAY2', and GRAY3' respectively corresponding to the first, second, and third pixels PX1, PX2, and PX3 may be supplied to the data driver DDR as the compensated data DATA3. Accordingly, the data driver DDR may generate each first data signal based on each compensated first grayscale value GRAY1' to supply it to each first pixel PX1. Similarly, the data driver DDR may generate each second data signal based on each compensated second grayscale value GRAY2' to supply it to each second pixel PX2, and may generate each third data signal based on each compensated third grayscale value GRAY3' to supply it to each third pixel PX3. Accordingly, the degradation of the pixels PX may be compensated.

As described above, the degradation compensator CPS may compensate the first grayscale value GRAY1 corresponding to each first pixel PX1 based on the first degradation curve according to the accumulated use time $t_1$ of the first pixel PX1 to generate the first compensated grayscale value GRAY1'. The degradation compensator CPS may compensate the second grayscale value GRAY2 corresponding to each second pixel PX2 based on the second degradation curve defining the estimated luminance according to the accumulated use time $t_1$ of the second pixel PX2 to generate the second compensated grayscale value GRAY2', and may compensate the third grayscale value GRAY3 corresponding to each third pixel PX3 based on the third degradation curve defining the estimated luminance according to the accumulated use time $t_3$ of the third pixel PX3 to generate the third compensated grayscale value GRAY3'.

Here, the second degradation curve may be defined by the second degradation coefficients $\tau_{q1}$ and $\beta_{q1}$ corresponding to an estimated degradation curve (also referred to as a "first estimated degradation curve") with respect to the first degradation coefficients $\tau_1$ and $\beta_1$ corresponding to the first degradation curve and the first light conversion particles QDg (for example, green color quantum dot QDg) calculated by using the first degradation curve. For example, in an embodiment, by using the degradation characteristic of the first pixel PX1 (for example, the first initial degradation curve or the first degradation curve) and the degradation characteristic of the second pixel PX2 (for example, the second initial degradation curve) detected during the degradation evaluation period, the degradation characteristic (for example, the first estimated degradation curve) of the first light conversion particles QDg may be calculated. It is possible to define or predict the degradation characteristic of the second pixel PX2 by linking the degradation characteristic of the first pixel PX1 and the degradation characteristic of the first light conversion particles QDg. Accordingly, it is possible to more accurately predict the degradation of the second pixel PX2, which represents a complex degradation characteristic by the light emitting element LD of the first color and the first light conversion particles QDg of the second color. Accordingly, the degradation of the second pixel PX2 may be effectively compensated.

Similarly, the third degradation curve may be defined by the third degradation coefficients $\tau_{q2}$ and $\beta_{q2}$ corresponding to an estimated degradation curve (also referred to as a "second estimated degradation curve") with respect to the first degradation coefficients $\tau_1$ and $\beta_1$ corresponding to the first degradation curve and the second light conversion particles QDr of the third color (for example, red color quantum dot QDr) calculated by using the first degradation curve. For example, in an embodiment, by using the degradation characteristic of the first pixel PX1 (for example, the first initial degradation curve or the first degradation curve) and the degradation characteristic of the third pixel PX3 (for example, the third initial degradation curve) detected during the degradation evaluation period, the degradation characteristic (for example, the second estimated degradation curve) of the second light conversion particles QDr may be calculated. It is possible to define or predict the degradation characteristic of the third pixel PX3 by linking the degradation characteristic of the first pixel PX1 and the degradation characteristic of the second light conversion particles QDr. Accordingly, it is possible to more accurately predict the degradation of the third pixel PX3, which represents a complex degradation characteristic by the light emitting element LD of the first color and the second light conversion particles QDr of the third color. Accordingly, the degradation of the third pixel PX3 may be effectively compensated.

Figure 16:
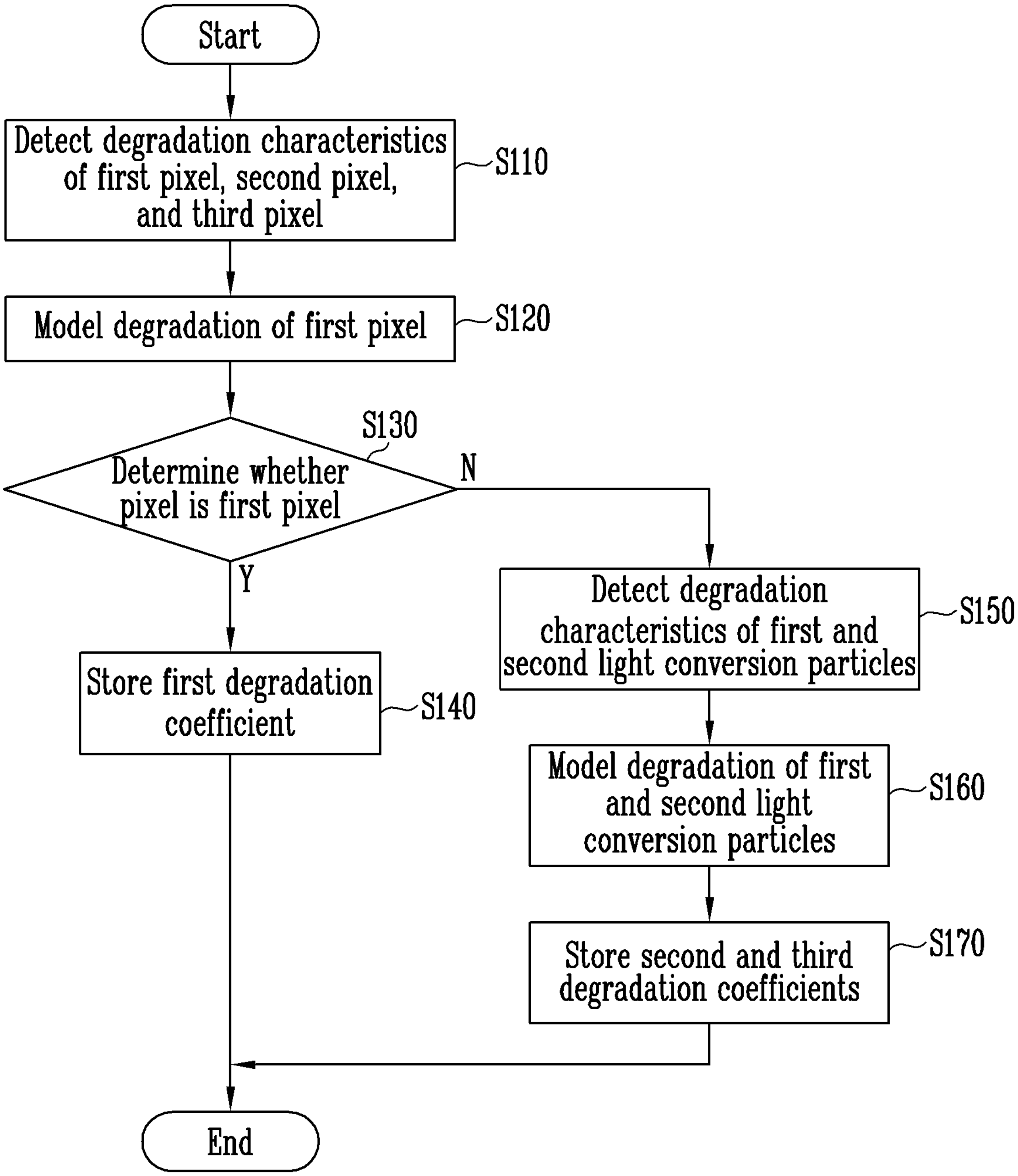
FIG. 16 and FIG. 17 illustrate flowcharts of a degradation compensating method of a display device according to an embodiment.
Figure 17:
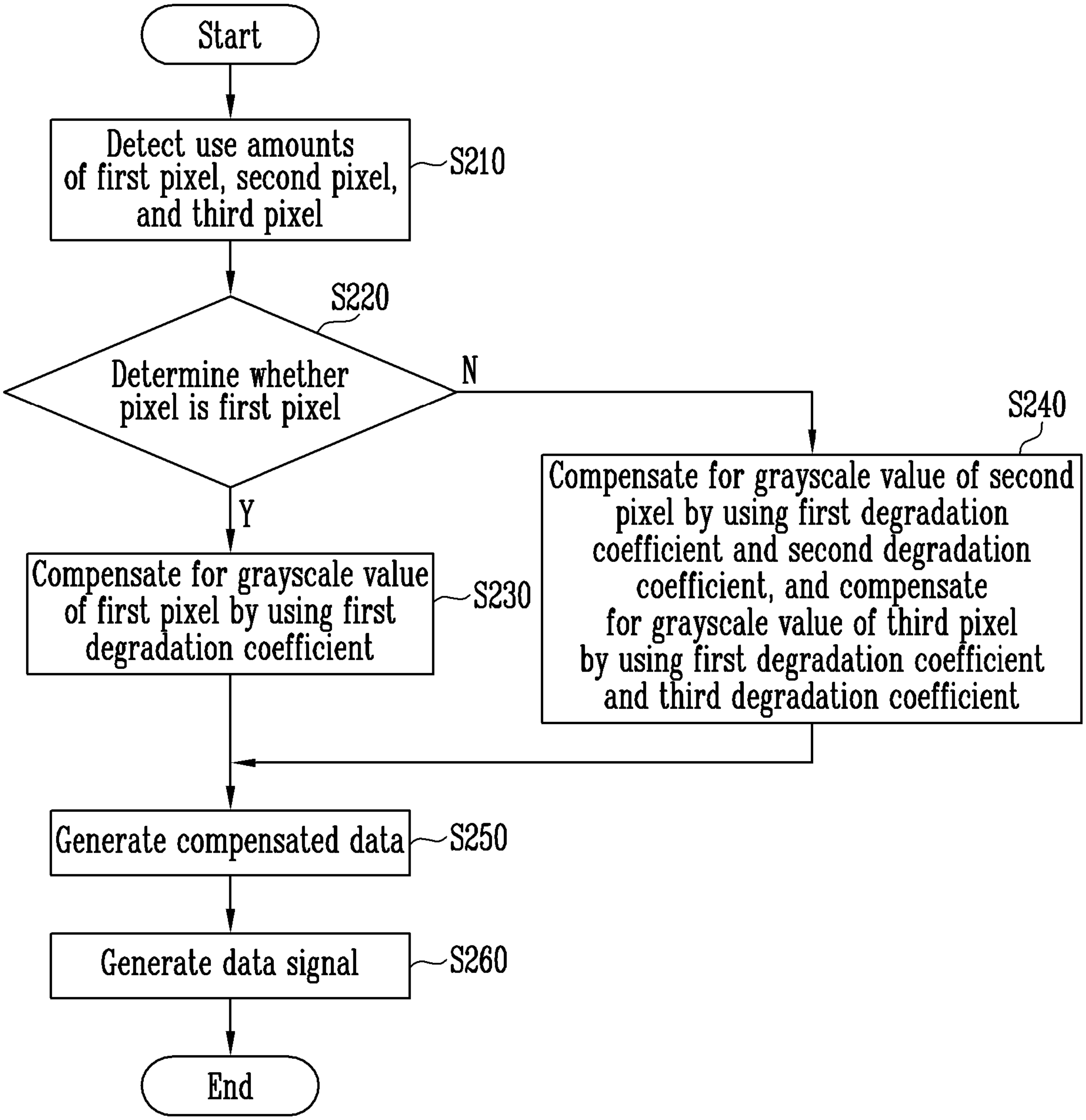

FIG. 16 and FIG. 17 illustrate flowcharts of a degradation compensating method of the display device DD according to an embodiment. For example, FIG. 16 illustrates a method of extracting the first, second, and third degradation coefficients $\tau_1$, $\tau_{q1}$, $\tau_{q2}$, $\beta_1$, $\beta_{q1}$, and $\beta_{q2}$, and FIG. 17 illustrates a method of compensating the luminance of the first, second, and third pixels PX1, PX2, and PX3 by using the first, second, and third degradation coefficients $\tau_1$, $\tau_{q1}$, $\tau_{q2}$, $\beta_1$, $\beta_{q1}$, and $\beta_{q2}$.

Referring to FIG. 16, first, the degradation characteristics of the first pixel PX1, the second pixel PX2, and third pixel PX3 may be detected. For example, during the degradation evaluation period, while driving the first pixel PX1, the second pixel PX2, and the third pixel PX3 corresponding to at least one reference gray, the first, second, and third initial degradation curves corresponding to the first, second, and third pixels PX1, PX2, and PX3 may be obtained (S110).

The degradation of the first pixel PX1 may be modeled by using the first initial degradation curve corresponding to the first pixel PX1. For example, the first initial degradation curve may be modeled as the first degradation curve for the first pixel PX1 (S120).

It is determined whether each pixel PX is the first pixel PX1 (S130), and in case that the pixel PX is the first pixel PX1, the first degradation coefficients $\tau_1$ and $\beta_1$ may be detected from the first degradation curve to be stored in the memory MEM (for example, the first lookup table LUT1) (S140).

By using the first initial degradation curve along with the second and third initial degradation curves, respectively, for the second and third pixels PX2 and PX3, the degradation characteristics of the first and second light conversion particles QDg and QDr of the second and third colors may be detected (S150).

The degradation of the first and second light conversion particles QDg and QDr may be modeled. For example, the first and second estimated degradation curves for the first and second light conversion particles QDg and QDr may be calculated (S160).

The second and third degradation coefficients $\tau_{q1}$, $\tau_{q2}$, $\beta_{q1}$ and $\beta_{q2}$ may be respectively detected from the first and second estimated degradation curves to be stored in the memory MEM (for example, the second and third lookup tables LUT2 and LUT3) (S170).

Referring to FIG. 17, after the actual use of the display device DD is performed, the use amount (for example, accumulated use time) of each of the first, second, and third pixels PX1, PX2, and PX3 may be detected (S210).

It is determined whether each pixel PX is the first pixel PX1 (S220), and in case that the pixel PX is the first pixel PX1, the compensated first grayscale value GRAY1' may be generated by compensating for the grayscale value (for example, the first grayscale value GRAY1) of the first pixel PX1 by using the first degradation coefficients $\tau_1$ and $\beta_1$ (S230).

The compensated second grayscale value GRAY2' may be generated by compensating for the grayscale value of the second pixel PX2 (for example, the second grayscale value GRAY2) by using the first degradation coefficients $\tau_1$ and $\beta_1$ and the second degradation coefficients $\tau_{q1}$ and $\beta_{q1}$, for the second pixel PX2. The compensated third grayscale value GRAY3' may be generated by compensating for the grayscale value of the third pixel PX3 (for example, the third grayscale value GRAY3) by using the first degradation coefficients $\tau_1$ and $\beta_1$ and the third degradation coefficients $\tau_{q2}$ and $\beta_{q2}$, for the third pixel PX3 (S240).

The compensated data DATA3 may be generated based on the compensated first, second, and third grayscale values GRAY1', GRAY2', and GRAY3' (S250).

A data signal may be generated by using the compensated data DATA3. For example, the first, second, and third data signals may be generated in response to the compensated first, second, and third grayscale values GRAY1', GRAY2', and GRAY3', respectively, and the first, second, and third data signals may be supplied to first, second, and third pixels PX1, PX2, and PX3. Accordingly, it is possible to effectively compensate the luminance of the pixels PX according to the degradation characteristic of each of the pixels PX (S260).

On the other hand, the display device DD according to the above-described embodiments may include the pixels (for example, the first pixels PX1) that do not include the light conversion particles QD and the pixels (for example, the second and third pixels PX2 and PX3) that include the light conversion particles QD, but the disclosure is not limited thereto. For example, the disclosure may be used to more accurately predict and compensate the degradation of the pixels PX even in the display device DD in which all the pixels PX provided to the display part DP include the light conversion particles QD. For example, a display device (or a display part) for degradation evaluation (hereinafter, referred to as a "sample display device"), which has a structure substantially similar to the display device DD (hereinafter, referred to as a "target display device") for compensating for degradation by applying the disclosure, but does not provide the light conversion particles QD in the pixels PX, may be manufactured. A first initial degradation curve is derived through degradation evaluation of the pixels PX of the sample display device, and an initial degradation curve for the pixels PX of the target display device is derived through degradation evaluation of the pixels PX of the target display device, so that the degradation curve for the pixels PX of the target display device may be defined in a same manner as in the second and third pixels PX2 and PX3 of the above-described embodiments. Accordingly, it is possible to more accurately predict the degradation of the pixels PX of the target display device and to effectively compensate for the degradation of the pixels PX.

In the above, the disclosure has been described with reference to the above-described embodiments, but it should be noted that the embodiments are for description and are not for limitation. It will be understood by those skilled in the art that various changes in form and details may be made therein without departing from the scope of the disclosure.

The scope of the disclosure may be determined by the scope of the accompanying claims. All changes or modifications that come within the meaning and scope of the claims and their equivalents will be interpreted as including the range of the disclosure.

What is claimed is:

1. A display device comprising:

a display part including:

a first pixel including a light emitting element of a first color; and a second pixel including:

another light emitting element of the first color; and light conversion particles of a second color that change the first color to the second color;

a degradation compensator that generates a first compensated grayscale value by compensating for a first grayscale value corresponding to the first pixel based on a first degradation curve defining an estimated luminance according to an accumulated use time of the first pixel, and generates a second compensated grayscale value by compensating for a second grayscale value corresponding to the second pixel based on a second degradation curve defining an estimated luminance that is decreased by the degradation of the light conversion particles of the second pixel according to an accumulated use time of the second pixel; and a data driver that generates a first data signal based on the first compensated grayscale value and supplies the first data signal to the first pixel, and generates a second data signal based on the second compensated grayscale value and supplies the second data signal to the second pixel, wherein the second degradation curve of the second pixel is defined by a first degradation coefficient corresponding to the first degradation curve, and a second degradation coefficient corresponding to a first estimated degradation curve for the light conversion particles of the second color calculated by applying the first degradation curve wherein the first degradation curve is defined by Equation 1:

$$L1 = \exp\left[-\left(\frac{t_1}{\tau_1}\right)^{\beta_1}\right] \quad \text{[Equation 1]}$$

wherein L1 is the estimated luminance according to the accumulated use time of the first pixel, $t_1$ is the accumulated use time of the first pixel, and $\tau_1$ and $\beta_1$ are the first degradation coefficients determined by an initial degradation curve of the first pixel detected in a degradation evaluation of the first pixel, and wherein the second degradation curve is defined by Equation 2:

$$L2' = \exp\left[-\left(\frac{t_2}{\tau_1}\right)^{\beta_1} - \left(\frac{t_2}{\tau_{q1}}\right)^{\beta_{q1}}\right] \quad \text{[Equation 2]}$$

wherein L2' is the estimated luminance according to the accumulated use time of the second pixel, $t_2$ is the accumulated use time of the second pixel, and $\tau_{q1}$ and $\beta_{q1}$ are the second degradation coefficients determined by the initial degradation curve of the first pixel and an initial degradation curve of the second pixel detected in a degradation evaluation of the second pixel.

2. The display device of claim 1, wherein the first estimated degradation curve is a degradation curve generated according to a ratio of a normalized luminance value of the initial degradation curve of the first pixel to a normalized luminance value of the initial degradation curve of the second pixel, and the second degradation coefficient is a degradation constant determined by the first estimated degradation curve.

3. The display device of claim 1, wherein the display part includes a third pixel including another light emitting element of the first color and light conversion particles of a third color that change the first color to the third color.

4. The display device of claim 3, wherein the degradation compensator generates a third compensated grayscale value by compensating for a third grayscale value corresponding to the third pixel based on a third degradation curve defining an estimated luminance according to an accumulated use time of the third pixel, and the data driver generates a third data signal based on the third compensated grayscale value and supplies the third data signal to the third pixel.

5. The display device of claim 4, wherein the third degradation curve is defined by the first degradation coefficient, and a third degradation coefficient corresponding to a second estimated degradation curve for the light conversion particles of the third color calculated by applying the first degradation curve.

6. The display device of claim 5, wherein the third degradation curve is defined by Equation 3:

$$L3' = \exp\left[-\left(\frac{t_3}{\tau_1}\right)^{\beta_1} - \left(\frac{t_3}{\tau_{q2}}\right)^{\beta_{q2}}\right] \quad \text{[Equation 3]}$$

wherein L3' is the estimated luminance according to the accumulated use time of the third pixel, $t_3$ is the accumulated use time of the third pixel, and $\tau_{q2}$ and $\beta_{q2}$ are the third degradation coefficients determined by the initial degradation curve of the first pixel and an initial degradation curve of the third pixel detected in a degradation evaluation of the third pixel.

7. The display device of claim 6, wherein the second estimated degradation curve is a degradation curve generated according to a ratio of a normalized luminance value of the initial degradation curve of the first pixel to a normalized luminance value of the initial degradation curve of the third pixel, and the third degradation coefficient is a degradation constant determined by the second estimated degradation curve.

8. The display device of claim 1, wherein the first pixel emits light of the first color, and the second pixel emits light of the second color.

9. The display device of claim 1, wherein each of the first pixel and the second pixel includes at least one blue light emitting element, and the light conversion particles of the second color are red quantum dots or green quantum dots.

10. The display device of claim 1, wherein the accumulated use time of the second pixel is generated by an accumulator in response to receiving at least a portion of compensated grayscale value output from the degradation compensator.

11. The display device of claim 1, wherein the second degradation coefficients are stored in a memory of the degradation compensator.

12. A degradation compensating method of a display device comprising;

detecting degradation characteristics of a first pixel and a second pixel to detect a first initial degradation curve for the first pixel and a second initial degradation curve for the second pixel, the second pixel having an accelerated degradation when the second pixel has one or more light conversion particles disposed over a light emitting element of the second pixel;

modeling a first degradation curve for the first pixel by the first initial degradation curve;

detecting a first degradation coefficient based on the first initial degradation curve;

detecting a second degradation coefficient based on the first initial degradation curve and the second initial degradation curve;

generating, using a degradation compensator, a first compensated grayscale value by compensating for a first grayscale value of the first pixel by applying the first degradation coefficient, and generating, using the degradation compensator, a second compensated grayscale value by compensating for a second grayscale value of the second pixel by applying the first degradation coefficient and the second degradation coefficient;

defining a second degradation curve according to the accumulated use time of the second pixel based on the first degradation coefficient and the second degradation coefficient;

generating a first data signal corresponding to the first compensated grayscale value, and generating a second data signal corresponding to the second compensated grayscale value; and supplying the first data signal to the first pixel, and supplying the second data signal to the second pixel the first degradation curve is defined by Equation 1:

$$L1 = \exp\left[-\left(\frac{t_1}{\tau_1}\right)^{\beta_1}\right] \quad \text{[Equation 1]}$$

wherein L1 is an estimated luminance according to an accumulated use time of the first pixel, $t_1$ is the accumulated use time of the first pixel, and $\tau_1$ and $\beta_1$ are the first degradation coefficients determined by the first initial degradation curve wherein the detecting of the second degradation coefficient includes:

calculating a ratio of a first luminance and a second luminance to calculate a first estimated degradation curve, the first luminance being the estimated luminance according to the accumulated use time of the first pixel according to the first initial degradation curve, and the second luminance being an estimated luminance according to an accumulated use time of the second pixel according to the second initial degradation curve; and detecting the second degradation coefficient based on the first estimated degradation curve, and wherein the second degradation curve is defined by Equation 2:

$$L2' = \exp\left[-\left(\frac{t_2}{\tau_1}\right)^{\beta_1} - \left(\frac{t_2}{\tau_{q1}}\right)^{\beta_{q1}}\right] \quad \text{[Equation 2]}$$

wherein L2' is the estimated luminance according to the accumulated use time of the second pixel, $t_2$ is the accumulated use time of the second pixel, and $\tau_{q1}$ and $\beta_{q1}$ are the second degradation coefficients determined by the first initial degradation curve and the second initial degradation curve.

* * * * *